United States Patent [19]
Spercel

[11] 3,937,331
[45] *Feb. 10, 1976

[54] BAR STOCK LOADER AND FEED MECHANISMS

[76] Inventor: Robert J. Spercel, c/o Sperco Inc., 7810 Lake Ave., Clevelend, Ohio 44102

[ * ] Notice: The portion of the term of this patent subsequent to June 4, 1991, has been disclaimed.

[22] Filed: Aug. 20, 1973

[21] Appl. No.: 389,731

Related U.S. Application Data

[63] Continuation-in-part of Ser. No. 262,544, June 14, 1972, Pat. No. 3,814,299.

[52] U.S. Cl.................. 214/1 PB; 82/2.7; 226/162
[51] Int. Cl.².......................................... B23Q 5/22
[58] Field of Search............ 214/1 P, 1 PB, 1.1, 1.2, 214/1.3, 1.4, 1.5; 82/2.5, 2.7; 226/162, 165, 167, 147, 149, 163, 164, 150

[56] References Cited
UNITED STATES PATENTS

| | | | |
|---|---|---|---|
| 2,730,230 | 1/1956 | Gordon | 226/149 |
| 3,147,653 | 9/1964 | Jones, Jr. | 214/1.4 X |
| 3,474,914 | 10/1969 | Kaplan | 214/1 PB |

*Primary Examiner*—Frank E. Werner
*Attorney, Agent, or Firm*—McNenny, Farrington, Pearne & Gordon

[57] ABSTRACT

An improved loader mechanism is used with a machine tool having a chuck which is operated between opened and closed conditions and a bar feed mechanism having a feed gripper which is also opened and closed. The loader mechanism is operable to transfer one piece of bar stock at a time from an intermediate station to a loading station while simultaneously transferring another piece of bar stock from a magazine to the intermediate station. After a piece of bar stock has been moved to the loading station, the piece of bar stock is registered relative to the feed gripper and chuck by activating a compensating cylinder to press the leading end of the piece of bar stock against a stop member. When the stop member has been moved out of the way of the registered piece of bar stock, a main cylinder is activated to push the registered piece of bar stock into the open feed gripper and chuck.

19 Claims, 16 Drawing Figures

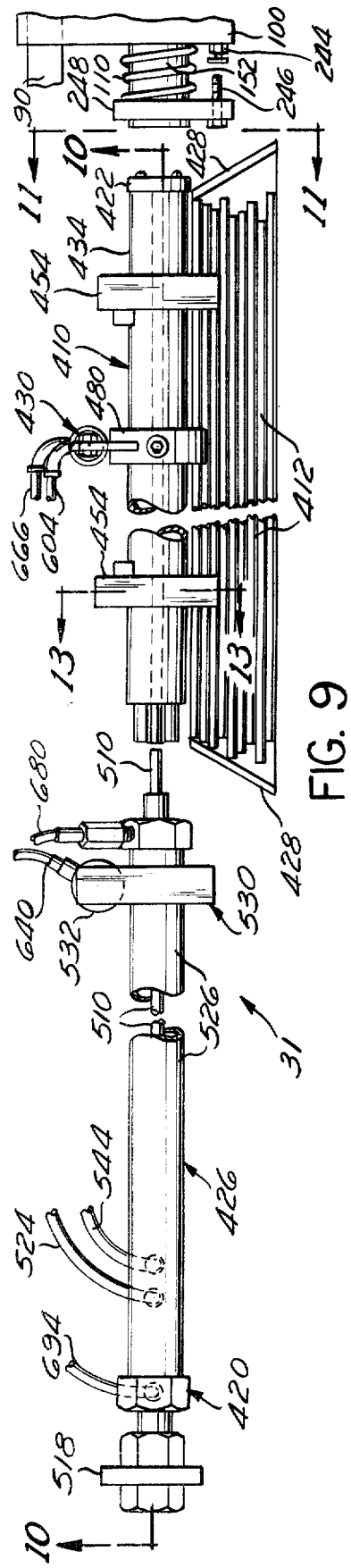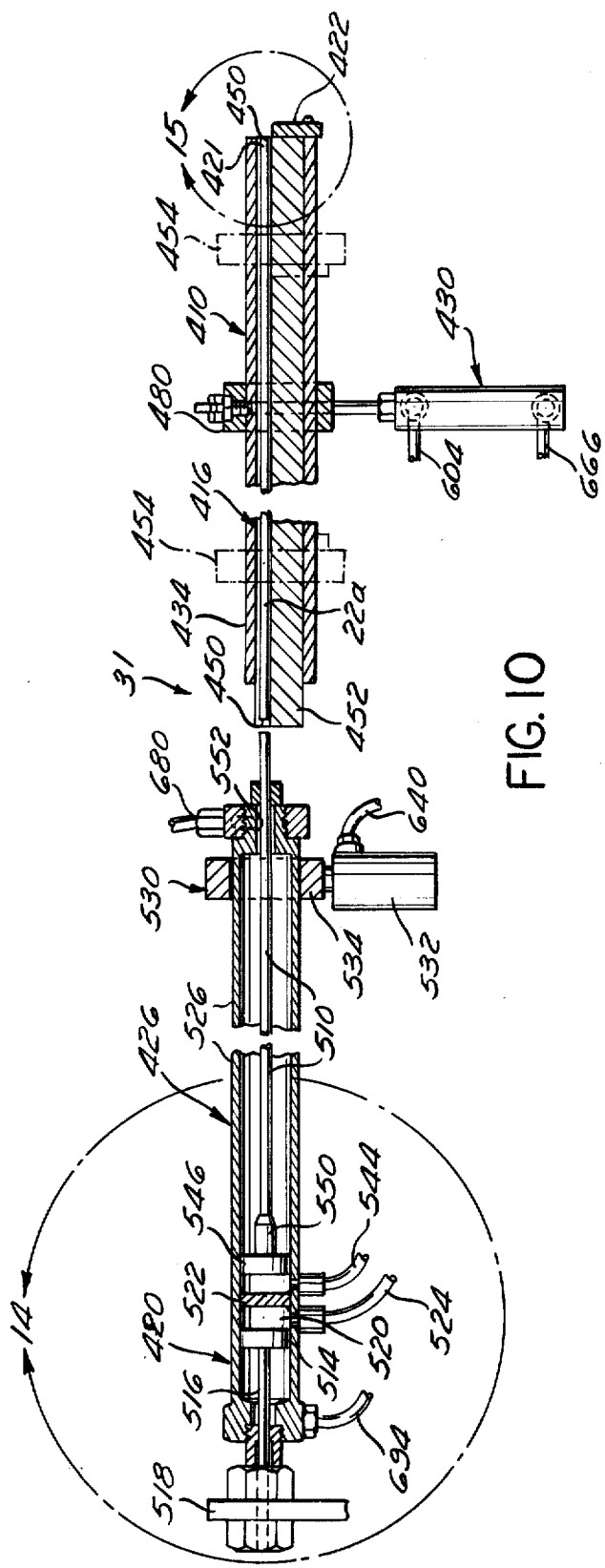

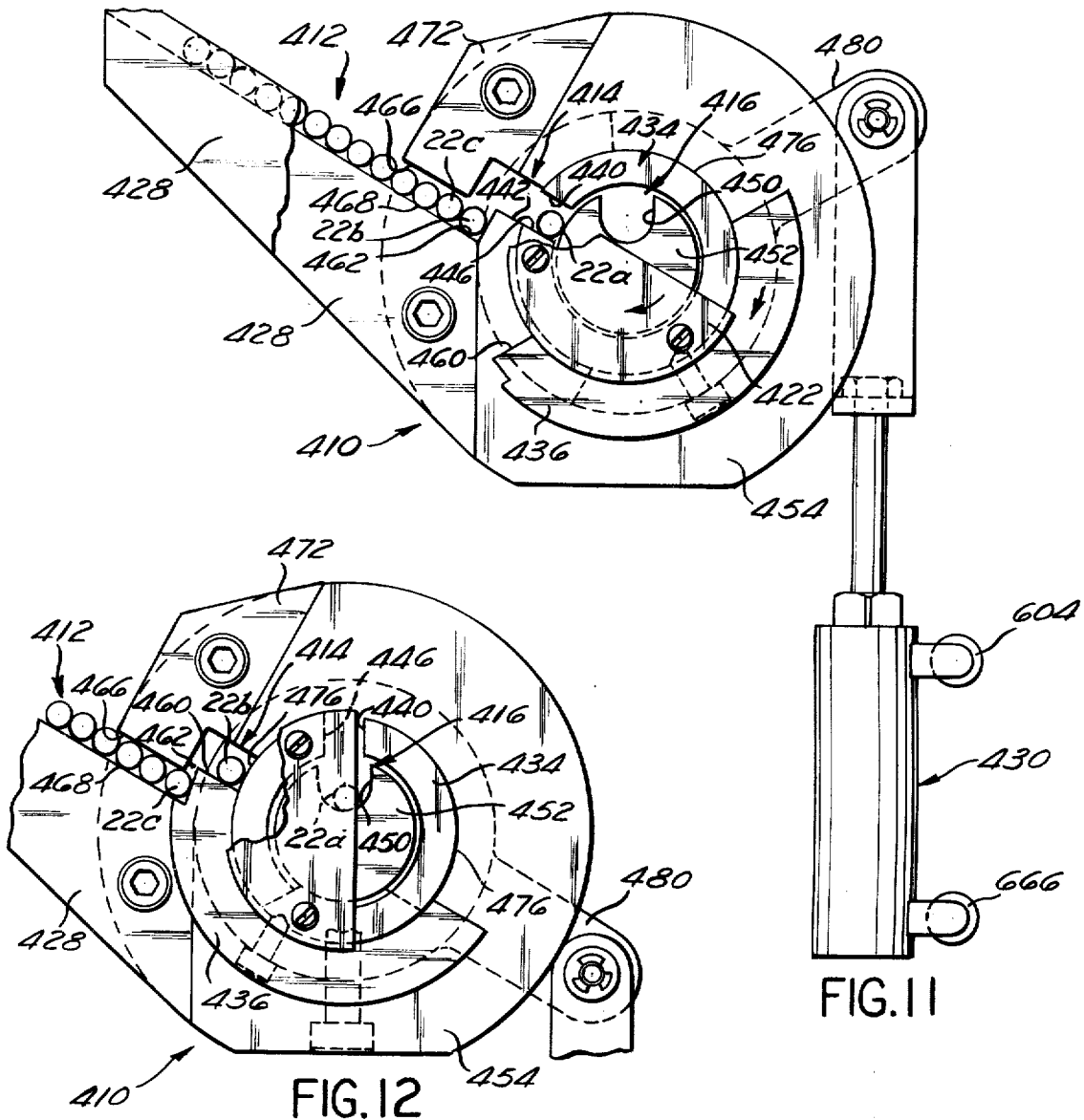
FIG.11
FIG.12
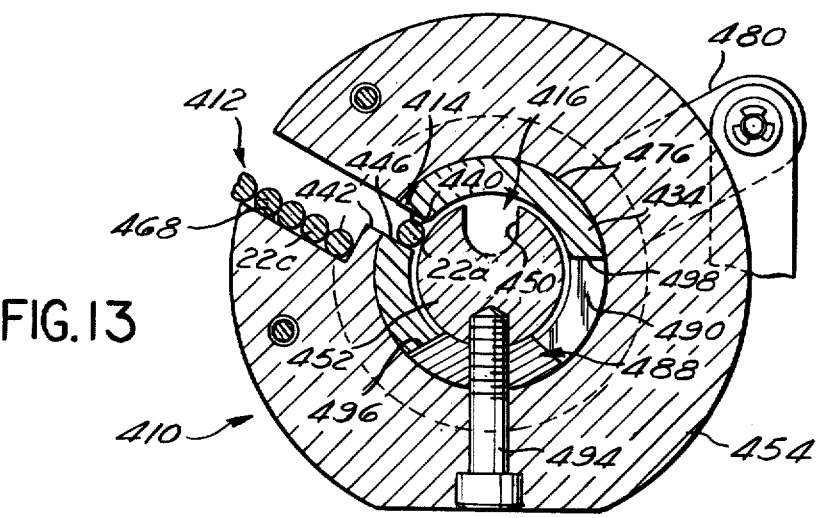
FIG.13

BAR STOCK LOADER AND FEED MECHANISMS

CROSS REFERENCE TO RELATED APPLICATION

The present application is a continuation-in-part of my copending application Ser. No. 262,544, filed June 14, 1972, now U.S. Pat. No. 3,814,299, entitled "Bar Stock Feed Mechanism."

BACKGROUND OF THE INVENTION

This invention relates generally to a bar stock loader mechanism and more specifically to a bar stock loader mechanism which may be utilized with a feed mechanism having a gripper assembly which is operable between opened and closed conditions.

A known bar stock loader mechanism includes a compensating cylinder which is actuated to move a main feed cylinder and a piece of bar stock toward the spindle or chuck of a machine tool until a switch is actuated. Actuation of the switch causes a clamp assembly to grip a piston rod of the compensating cylinder to hold the main feed cylinder against further movement. The main feed cylinder is then activated to push the piece of bar stock into the machine tool. This known loader mechanism is disclosed in U.S. Pat. No. 2,746,128.

Another known loader mechanism includes a magazine which holds a plurality of bars in a side-by-side relationship and a rotatable indexing or support cylinder. The indexing cylinder transfers the bars from the magazine to a loading station and supports the bars as they are moved from the loader mechanism into the associated machine tool. An example of this known loader mechanism is illustrated in German Patentschrift No. 571,614 having a date of Feb. 9, 1933.

SUMMARY OF THE PRESENT INVENTION

The present invention provides a loader mechanism which is utilized in combination with a bar stock feed mechanism of the type disclosed in my copending application Ser. No. 262,544, filed June 14, 1972, and entitled "Bar Stock Feed Mechanism." This bar stock feed mechanism includes a gripper assembly which is operated between opened and closed conditions and a spindle chuck which is opened and closed. Prior to initiation of a bar feed operation, the gripper assembly is closed to securely grip the bar stock. The spindle chuck is then opened and the gripper assembly is moved toward the chuck through a feed stroke. Upon completion of the feed stroke, the chuck is closed and the gripper assembly is opened and moved away from the chuck through a return stroke. Whenever the remaining piece of bar stock becomes too short to make a next succeeding workpiece, a detector is activated and a loader mechanism constructed in accordance with one aspect of the present invention is operated to move a new piece of bar stock into the open gripper assembly.

The loader mechanism includes a magazine from which pieces of bar stock are first transferred to an intermediate station and then to a loading station by a transfer mechanism. A compensating cylinder is activated to register a piece of bar stock at the loading station with the feed mechanism and spindle chuck of the associated machine tool by pressing the leading end of the bar stock against a stop connected with the transfer mechanism. Once the leading end of the bar stock has been registered, a clamp or gripper device is operated to hold a feed cylinder against movement. After the stop member has been withdrawn and the feed mechanism has been opened to receive a piece of bar stock, the feed cylinder is activated to push the piece of bar stock into the feed mechanism.

In the illustrated embodiment of the invention, the feed cylinder also pushes the bar stock into the open spindle chuck with the leading end portion of the bar stock extending into a work area so that it can be trimmed or squared-off with suitable cutting tools. However, under certain circumstances, it may be desirable to utilize the feed mechanism to feed the bar stock to the spindle chuck rather than loading the bar stock directly into the spindle chuck. The loader and bar feed mechanisms are constructed so that they can be readily utilized with existing machine tools.

Accordingly, it is an object of this invention to provide a new and improved bar stock loader mechanism which is relatively compact, reliable in operation, and suitable for use in conjunction with many different types of machine tools.

Another object of this invention is to provide a new and improved loader and bar feed mechanism wherein the bar feed mechanism includes a gripper which is operated between opened and closed conditions and the loader mechanism is operable to move a piece of bar stock into the bar feed mechanism when the gripper is in the opened condition.

Another object of this invention is to provide a new and improved apparatus which is operable through a plurality of working cycles to perform work operations on a piece of bar stock at a work area and a loading cycle during which another piece of bar stock is moved into the apparatus and wherein this apparatus includes a feed gripper and chuck which are operable between opened and closed conditions, a drive assembly for moving the feed gripper through forward and reverse strokes to feed bar stock to the chuck, a loader mechanism for moving a piece of bar stock into the feed gripper during a loading cycle, and a control assembly which is operable to change the operating sequence of the feed gripper relative to the chuck from a working cycle sequence to a loading cycle sequence to facilitate transfer of bar stock from the loader mechanism to the feed mechanism.

Another object of this invention is to provide a new and improved loader mechanism having a magazine which holds a plurality of pieces of bar stock and a transfer device for transferring one piece of bar stock at a time from the magazine to an intermediate station and for simultaneously therewith moving another piece of bar stock from the intermediate station to a loading station.

BRIEF DESCRIPTION OF THE DRAWINGS

The foregoing and other objects and features of the present invention will become more apparent upon a consideration of the following description taken in connection with the accompanying drawings, wherein:

FIG. 9 is a plan view of the bar stock loader mechanism which cooperates with the bar feed mechanism of FIG. 1;

FIG. 10 is a sectional view taken along the line 10—10 of FIG. 9, illustrating the relationship between a transfer device for moving a piece of bar stock to a loading station, a compensating cylinder for registering the piece of bar stock at the loading station, and a main cylinder for pushing the piece of bar stock from the loading station into the feed mechanism of FIGS. 1 and 2;

FIG. 11 is a partially broken away end view illustrating the relationship between the transfer mechanism and a magazine which holds a plurality of pieces of bar stock, the transfer mechanism being shown without a piece of bar stock at a loading station and with a piece of bar stock at an intermediate station;

FIG. 12 is an end view, generally similar to FIG. 11, illustrating the transfer mechanism in an actuated condition in which a piece of bar stock has been moved from the intermediate station to the loading station and a next succeeding piece of bar stock has been moved from the magazine to the intermediate station;

FIG. 13 is a sectional view, taken generally along the line 13—13 of FIG. 9, further illustrating the construction of the transfer mechanism, a transfer tube being shown engaging a piece of bar stock at the intermediate station with a preceding piece of bar stock at the loading station;

DESCRIPTION OF ONE SPECIFIC EMBODIMENT OF THE INVENTION

Figure 1:
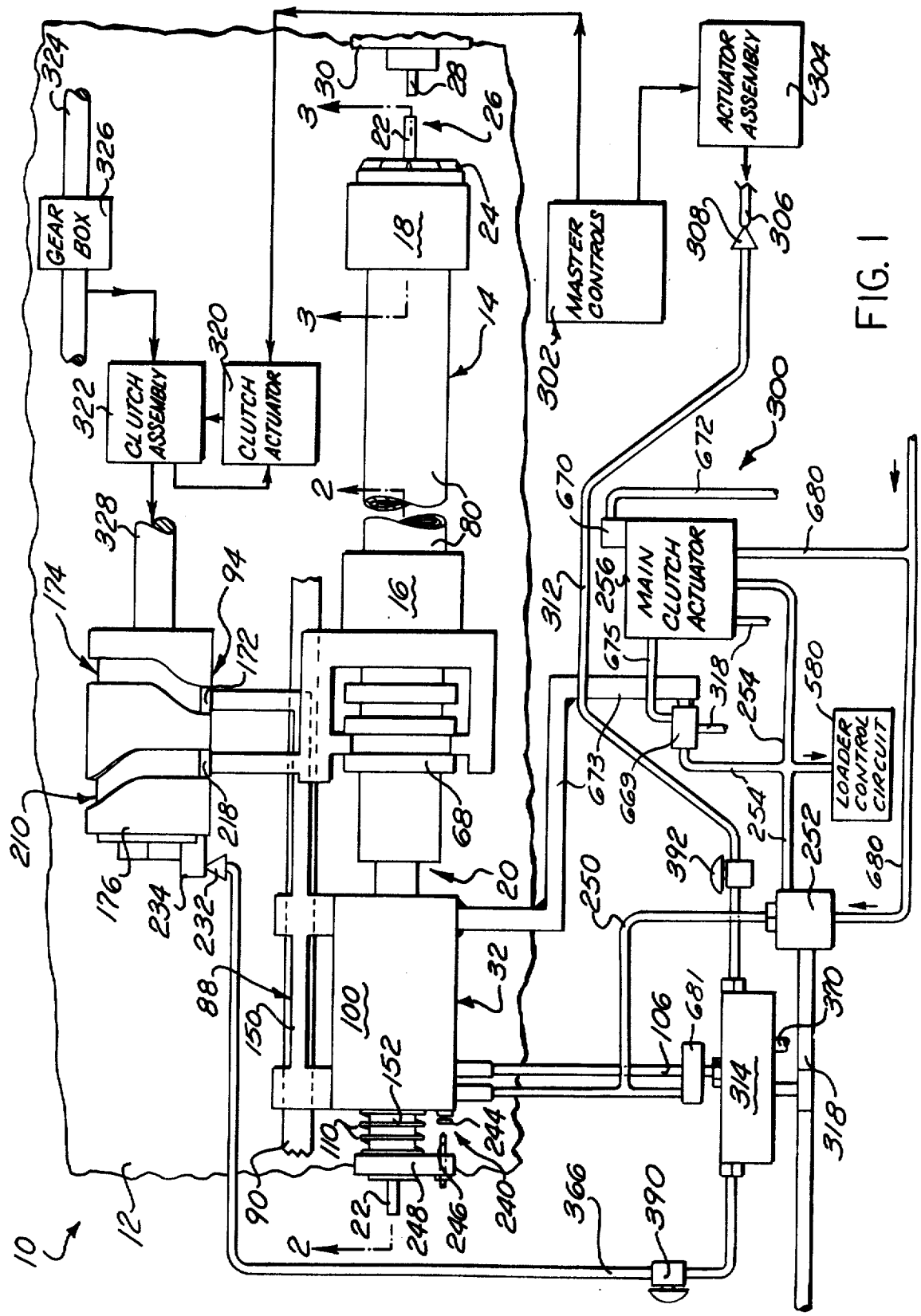
FIG. 1 is a schematic illustration of a machine tool having bar stock loader feed mechanisms constructed in accordance with the present invention, only the feed mechanisms being shown in FIG. 1.

A machine tool 10, illustrated schematically in FIG. 1, includes a base 12 on which a known spindle 14 is rotatably mounted by suitable bearings 16 and 18. A bar stock feed mechanism 20 is operable through feed and return strokes to feed incremental lengths of a piece of bar stock 22 through a spindle chuck 24 to a work area 26, where machining operations are performed on the leading end portion of the bar stock by tools 28 mounted on a movable turret 30. In accordance with a feature of this invention, when machining operations are completed on one piece of bar stock, a loader mechanism 31 is activated to move a new piece of bar stock into the bar stock feed mechanism 20.

Figure 2:
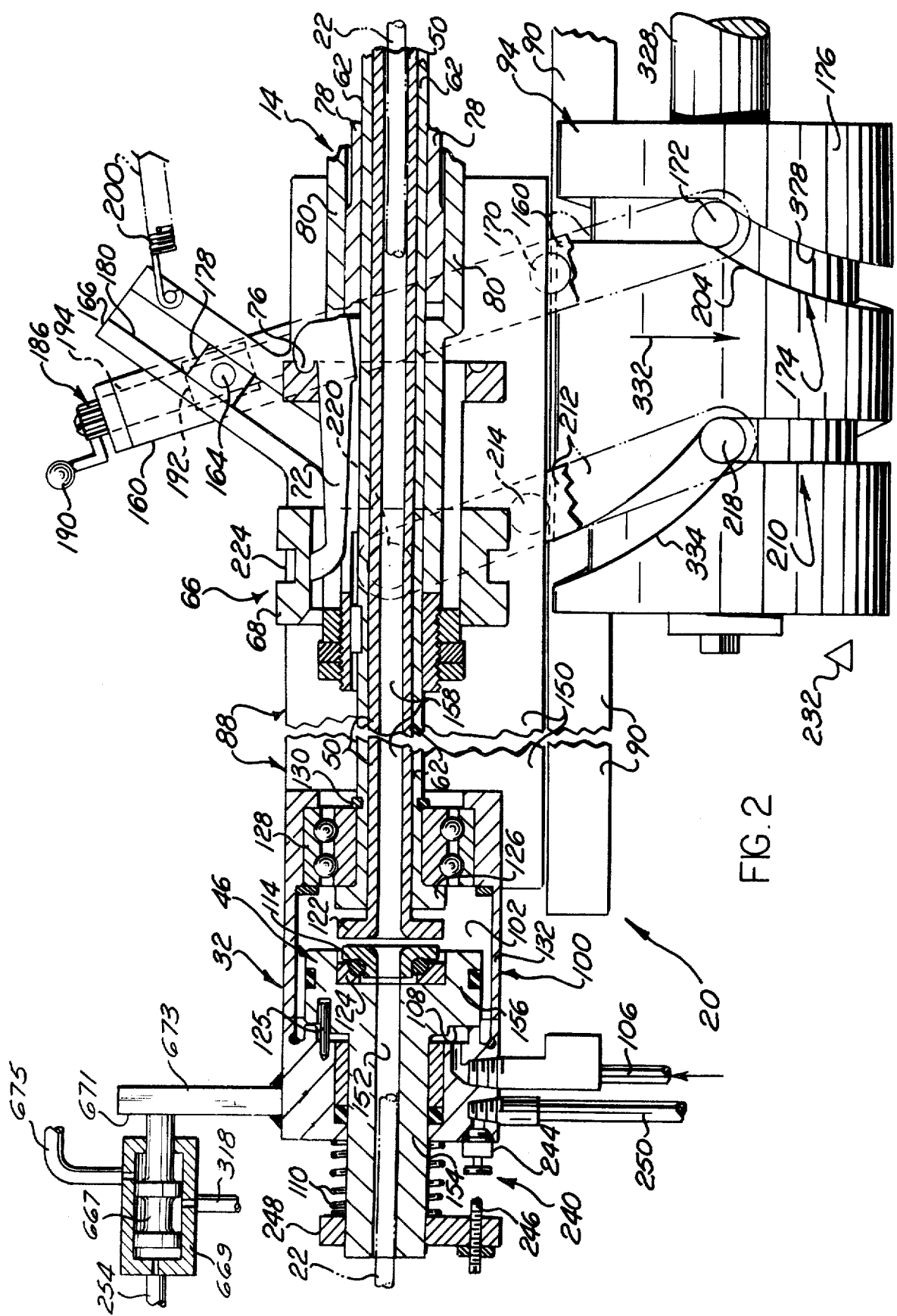
FIG. 2 is a schematic, sectional view, taken generally along the line 2—2 of FIG. 1, illustrating a portion of the bar stock feed mechanism in a withdrawn or retracted position prior to initiation of a feed stroke.
Figure 3:
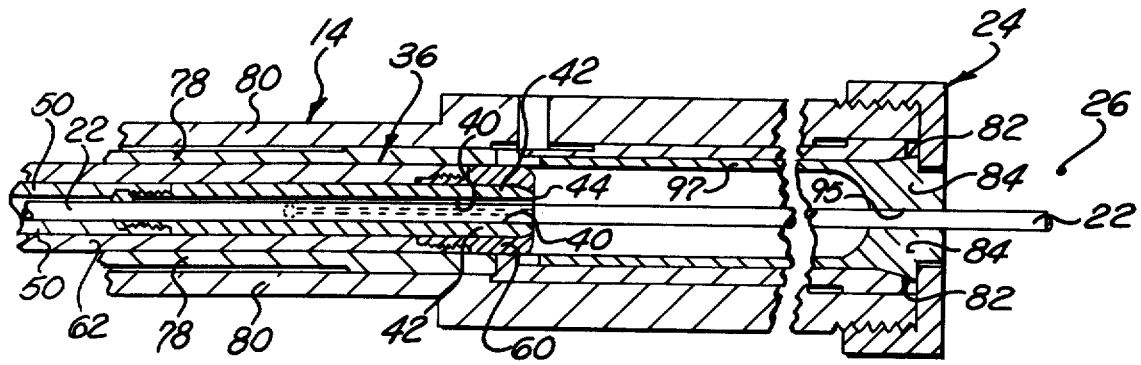
FIG. 3 is a sectional view, taken generally along the line 3—3 of FIG. 1, illustrating the relationship between a spindle chuck and gripper assembly of the bar feed mechanism, the gripper assembly being shown opened and in a retracted position prior to initiation of a feed stroke.
Figure 4:
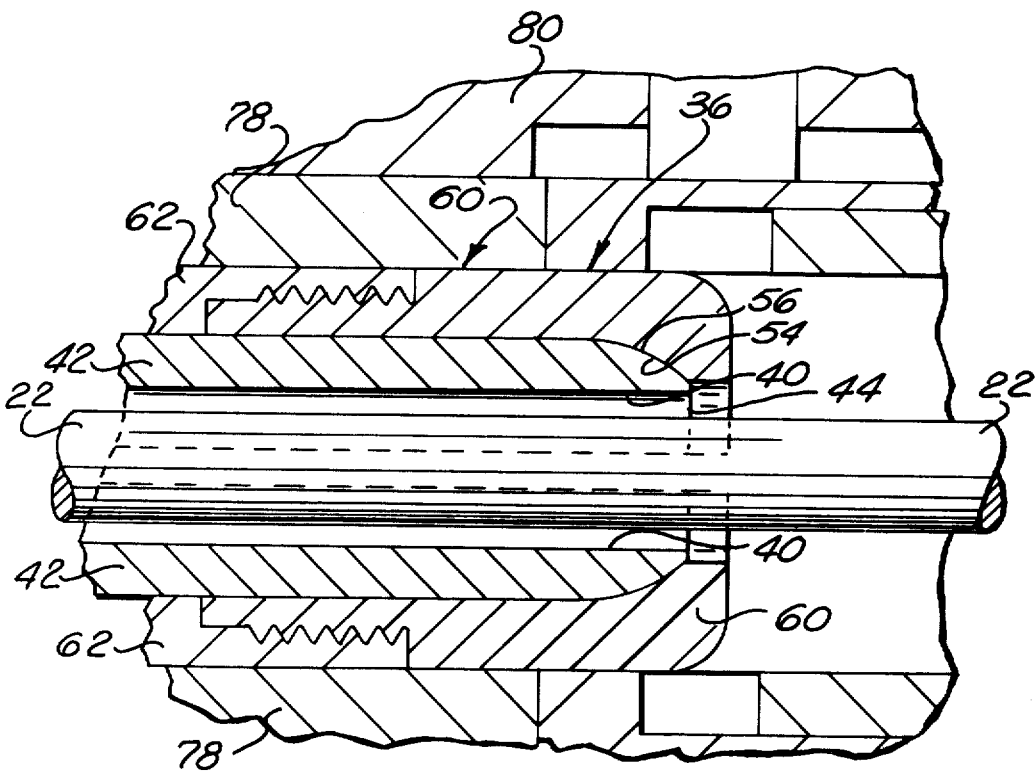
FIG. 4 is an enlarged, fragmentary, sectional view, further illustrating the relationship between the bar stock and the open gripper assembly of FIG. 3.
Figure 6:
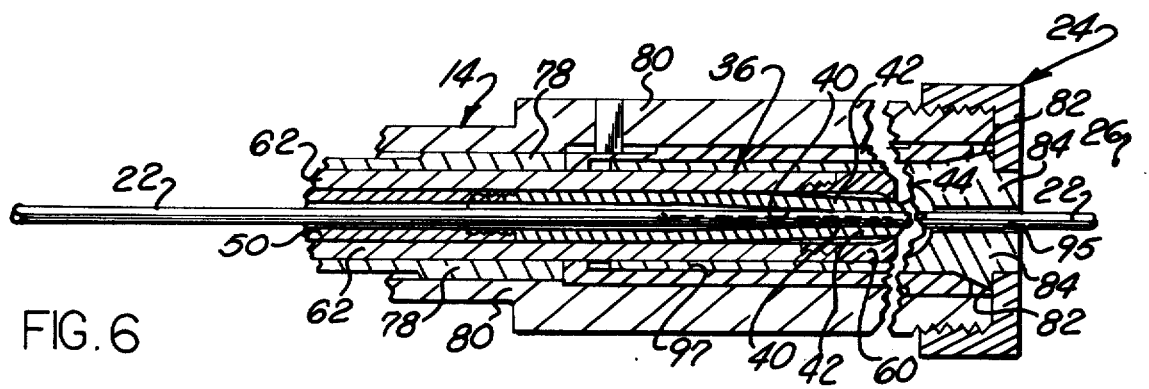
FIG. 6 is a sectional view, generally similar to FIG. 3, illustrating the gripper assembly in a closed condition and in an extended position at the end of a feed stroke.

The bar stock feed mechanism 20 includes an actuator assembly 32 (FIG. 2) for operating a bar feed gripper assembly 36 between the open condition of FIG. 3 and the closed condition of FIG. 6. When the gripper assembly 36 is in the open condition of FIG. 3, gripping surface 40 on collet fingers 42 defines a relatively large circular opening 44 and are spaced from the cylindrical outer surface of the bar stock 22 (see FIG. 4).

During operation of the machine tool 10, the spindle 14 rotates the bar stock 22 in the work area 26, while tools 28 on the turret 30 work on the bar stock. At the end of a machining operation, a suitable cross slide (not shown) is actuated to cut off the leading end portion of the bar stock 22 immediately adjacent to the chuck 24. The bar stock feed mechanism 20 is then activated to feed a predetermined length of the bar stock 22 into the work area 26.

At the end of the machining operation and prior to initiation of a bar feed operation, the bar stock feed mechanism 20 is in the retracted or withdrawn position of FIG. 2 so that the gripper assembly 36 is spaced from the spindle chuck 24 (see FIG. 3, which is a continuation of FIG. 2). Immediately prior to the end of the preceding machining operation, the gripper assembly 36 is operated from the open condition of FIG. 3 to the closed condition of FIG. 6 to securely grip or clamp the bar stock 22 with the collet fingers 42, which are disposed in a circular array around the bar stock. To close the gripper assembly 36, a piston 46 in the gripper actuator assembly 32 presses a cylindrical bar stock actuator tube 50 toward the right (as viewed in FIGS. 2 and 3). This movement of the actuator tube 50 presses inclined surfaces 54 (FIG. 4) on axially outer ends of the collet fingers 42 against an annular cam surface 56 formed on the inside of a nose portion 60 of a cylindrical feed tube 62. As the inclined surfaces 54 on the collet fingers 42 are pressed against the annular cam surface 56, the collet fingers 42 are resiliently deflected inwardly to reduce the size of the opening 44 and to move the surfaces 40 into clamping engagement with the outer surface of the bar stock 22.

Figure 5:
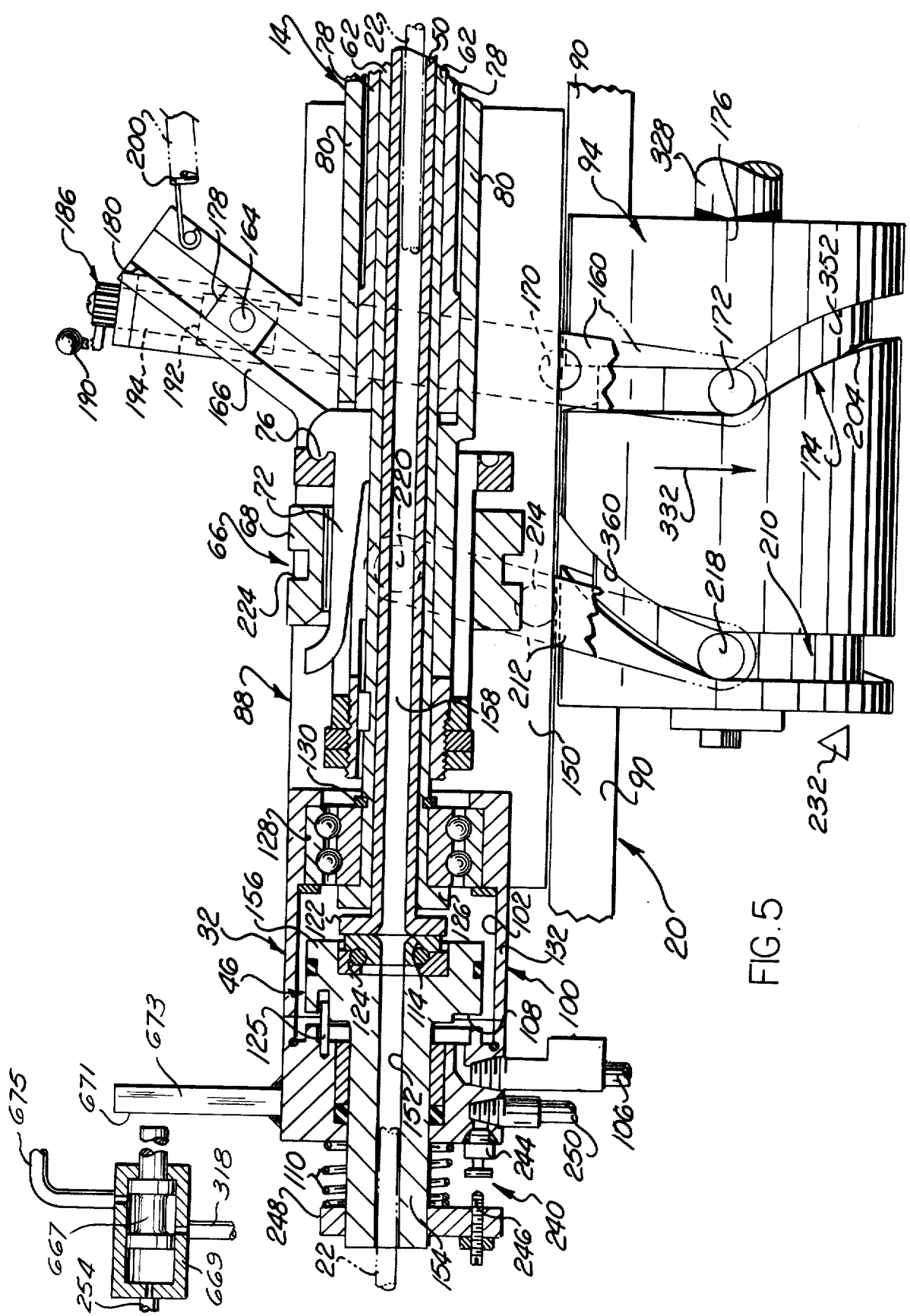
FIG. 5 is a sectional view, generally similar to FIG. 2, illustrating a portion of the bar stock feed mechanism at the end of a feed stroke.

Once the bar stock 22 has been securely clamped by the gripper assembly 36, the spindle chuck 24 is operated from the closed position of FIG. 3 to the open position of FIG. 6 by a known chuck actuator assembly 66 (see FIGS. 2 and 5). The chuck actuator assembly 66 includes a locking or chucking sleeve 68 which is moved axially toward the chuck 24 to release a plurality of chucking levers 72 (only one of which is shown in FIGS. 2 and 5) for pivotal movement about their nose portions 76. This pivotal movement of the chucking levers 72 releases a chuck actuator tube or sleeve 78 for axial movement relative to a cylindrical spindle tube or housing 80. The released actuator tube 78 is moved axially rearwardly by camming surfaces 82 (FIG. 3) formed on outwardly biased chuck collet fingers 84 as the chuck 24 opens. Thus, as the chucking levers 72 pivot in a clockwise direction from the position shown in FIG. 2 to the position shown in FIG. 5, the resilient chuck fingers 84 press the cam surfaces 82 outwardly against the annular outer end portion of the chuck actuator tube 78 to move the chuck actuator tube toward the left from the position shown in FIGS. 2 and 3 to the positions shown in FIGS. 5 and 6. As the resilient chuck fingers 84 move outwardly, the chuck 24 releases the bar stock 22 so that it is held only by the gripper assembly 36.

Once the bar stock 22 has been released by the chuck 24, the bar stock feed mechanism 20 moves the gripper assembly 36 through a feed stroke toward the now open chuck 24 to feed a predetermined length of bar stock into the work area 26. To provide for this movement of the gripper assembly 36, a slide assembly 88 is movable along a track 90 (FIG. 1) on the machine tool base 12 under the influence of a cam drive assembly 94. As the slide assembly 88 is moved forwardly, the bar feed tube 62 and actuator tube 50 are moved toward the right from the position shown in FIGS. 2 and 3 to the position shown in FIGS. 5 and 6. Of course, rightward movement of the bar feed tube 62 and actuator tube 50 moves the now closed gripper assembly 36 toward the work area 26 to push bar stock through the open chuck 24.

At the end of a feed stroke, the chuck actuator assembly 66 closes the chuck 24 to clampingly grip the bar stock 22. To effect operation of the chuck 24 to the closed condition, the chucking sleeve 68 is moved axially from the position shown in FIG. 5 to the position shown in FIG. 2 to cam the chucking levers 72 in a counterclockwise direction about their nose portions 76. This counterclockwise movement of the chucking levers 72 forces the chuck actuator tube 78 axially forwardly against the influence of resilient chuck jaws 84. As the chuck actuator tube 78 moves forwardly, the chuck jaws 84 are cammed inwardly to securely grip the bar stock 22. It should be noted that at the end of a feed stroke, the gripper assembly 36 is closely adjacent to clamping surfaces 95 on the chuck jaws 84, and is disposed inwardly of an axially extending body portion 97 which is integrally formed with the chuck jaws 84. This close proximity between the gripper assembly 36 and chuck jaws 84 at the end of a feed stroke tends to minimize the length of a remnant end portion of the bar stock and scrap material.

After the chuck 24 has been closed, the gripper assembly 36 is opened and moved through a return stroke. Thus, once the chuck 24 has clampingly gripped the bar stock 22, the actuator assembly 32 is operated from the activated condition of FIG. 5 to the released condition of FIG. 2. As the actuator assembly 32 moves to the released condition of FIG. 2, the piston 46 moves rearwardly to release the gripper actuator tube 50. The released gripper actuator tube 50 is then moved rearwardly under the influence of a camming action between surface 54 on the resiliently inwardly deflected gripper fingers 42 and the surface 56 on the nose portion 60 of the feed tube 62. Once the gripper fingers 42 reach the open position of FIG. 4, the gripping surfaces 40 on the inside of the gripper fingers are spaced from the outside of the bar stock 22 so that the gripper assembly 36 can be freely moved relative to the bar stock.

When the gripper assembly 36 has been opened, the slide assembly 88 is moved rearwardly under the influence of the cam drive assembly 94. As the slide assembly 88 is moved rearwardly from the position shown in FIG. 5 to the position shown in FIG. 2, the open gripper assembly 36 is moved axially through a return stroke along the bar stock 22 toward the retracted position shown in FIG. 3. Toward the end of the next succeeding machining operation, the gripper assembly 36 is again operated to the closed condition in readiness for the next succeeding feed stroke.

The bar feed actuator assembly 32 effects operation of the gripper assembly 36 between the open and closed conditions. The actuator assembly 32 includes a cylinder assembly 100 (FIG. 2) which defines a cylindrical chamber 102 in which the piston 46 is slidably disposed. (An air cylinder is illustrated, although other actuators, such as a hydraulic cylinder or an appropriate electrical actuator and/or mechanical linkage, may be employed.) When the gripper assembly 36 is to be closed, air under pressure is conducted through a line or conduit 106 to an end face 108 of the piston 46. This results in the piston 46 being moved toward the right (as viewed in FIG. 2) against the influence of a return spring 110. As the piston 46 moves toward the right, a thrust plate 114 is moved into abutting engagement with a flanged rearward end portion 122 of the gripper actuator tube 50. The thrust plate 114 is rotatably supported on the piston 46 by a bearing 124 to enable the gripper actuator tube 50 and thrust plate 114 to rotate with the bar stock 22 and spindle 14 during operation of the machine tool 10. The piston 46 is retained against rotation by a pin 125.

Continued movement of the piston 46 toward the right (as viewed in FIG. 2) presses the flanged end portion of the actuator tube 50 toward an annular flanged end portion 126 of the bar feed tube 62. The bar feed tube 62 is retained against axial movement by a bearing assembly 128 having an inner race which is held between the flanged end portion 126 and a locking ring 130 on the bar feed tube 62. The outer race of the bearing assembly 128 is connected to an outer wall 132 of the cylinder 100. Since the feed tube 62 cannot move axially relative to the cylinder 100, the piston 46 moves the actuator tube 50 axially forwardly to effect a camming interaction between the gripper fingers 42 and the nose portion 60 of the gripper assembly 36. This camming interaction closes the gripper assembly 36 in the manner previously explained.

The closed gripper assembly 36 is moved through a feed stroke by moving the actuator assembly 32 and slide assembly 88 forwardly from the position shown in FIG. 2 to the position shown in FIG. 5. The slide assembly 88 includes a generally rectangular base section 150 which is moved along the guide track 90 through feed and return strokes by the cam drive 94. The actuator assembly 32 is mounted on the base section 150. When the slide assembly 88 is moved forwardly along the track 90, the piston 46, cylinder assembly 100, closed gripper assembly 36, and bar stock 22 are moved together toward the spindle chuck 24 through a feed stroke. During this feed stroke, the bar stock 22 moves forward through the same distance as the slide assembly 88. Therefore, the distance through which the slide assembly 88 is moved forward determines the length of the bar stock fed to the work area 26. Of course, during a return stroke, the gripper assembly 36 is opened and is ineffective to move the bar stock 22 relative to the closed spindle chuck 24.

During the return stroke, the open gripper assembly 36, actuator assembly 32, and slide assembly 88 are all moved rearwardly along the bar stock 22. To provide for this relative movement between the bar stock 22 and actuator assembly 32, a cylindrical passage 152 is formed in a piston rod 154 which extends axially rearwardly from the head 156 of the piston 46. The passage 152 has a larger cross sectional area than the bar stock 22 and forms a continuation of a cylindrical passage 158 extending axially through the actuator tube 50 to the circular opening 44 defined by the gripper assembly 36. During a machining operation, the spindle 14 rotates the bar stock 22 in the passage 152 while the piston 46 is held against rotation.

The cam drive assembly 94 reciprocates the slide assembly 88 to accurately feed the same predetermined length of bar stock through the chuck 24 during each successive bar feed operation. The drive assembly 94 includes drive lever 160 (FIG. 2) which is pivotally connected at 164 to an upstanding arm 166. The arm 166 is integrally formed with the base 150 of the slide assembly 88. The drive lever 160 is pivotally connected at 170 with the base 12 of the machine tool 10. A cam follower 172 on an outer end portion of the drive lever 160 is disposed in engagement with a track 174 in a barrel cam member 176.

Upon rotation of the barrel cam member 176, the cam track 174 causes the drive lever 160 to pivot about the connection 170. This pivotal movement of the drive lever 160 reciprocates the slide assembly 88 between the positions shown in FIGS. 2 and 5. During this reciprocating movement of the slide assembly 88, a slide block 178 moves in and out along a track 180 formed in the upwardly projecting arm 166 to enable the pivot connection 164 to move along an arcuate path.

To enable the length of the feed and return strokes to be varied, a screw-type actuator assembly 186 is selectively operable to move the slide block 178 inwardly or outwardly along the track 180. Thus, if a longer feed stroke is desired, a handle 190 is rotated to move a slide block 192 outwardly along a track 194 formed in the lever 160. The slide block 192 is pivotally connected at 164 to the slide block 178 on the arm 166. Therefore, outward movement of the slide block 192 pulls the slide block 178 and pivot connection 164 outwardly to increase the feed stroke through which the slide assembly 88 is moved. Similarly, when the pivot connection 164 is moved inwardly, the feed stroke is decreased. If desired, the handle 190 may be actuated to infinitely adjust the feed stroke through a range of adjustment during operation of the machine tool 10 to control part length, for example. If desired, by appropriate addition of trip dogs, modification of camming, or other reprogramming, the same part may be successively fed with cut-off occurring after each set of two or more feed advances. Also, the feed length may be automatically adjusted (as for example by automatic adjustment of the handle 190) to automatically vary the lengths of the feed strokes when the same part is being successively fed. It is contemplated that a device could be provided to automatically change the length of the feed stroke on successive operating cycles of the bar feed mechanism 20.

In accordance with a feature of the present invention, the bar stock feed mechanism 20 is operable to accurately feed a desired length of bar stock to the work area 26 on each feed stroke. To provide for this relatively accurate feeding of bar stock, the cam follower 172 is continuously maintained in pressure engagement with one side or surface of the cam track 174. To this end, a spring 200 is connected to the base 150 of the slide assembly 88 and continuously urges the base toward the right, as viewed in FIG. 2. This biasing force urges the drive lever 160 in a clockwise direction about the connection 170. Since the drive lever 160 tends to pivot in a clockwise direction about the pivot connection 170, the cam follower or roller 172 is urged into continuous abutting engagement with the left hand side (as viewed in FIG. 2) or surface 204 of the cam track 174.

Since the roller 172 is continuously urged against one side of the cam track 174 by the action of the spring 200, the extent to which the lever 160 is pivoted about the connection 170 is determined by the shape of the cam track 174. Therefore, the slide 88 is accurately moved through feed and return strokes of the same length on successive revolutions of the drum cam 176. During operation of one specific embodiment of the invention, it was found that bar stock could be consistently fed with an accuracy of ±0.0015 inch. By comparison, for operation of a screw machine having a friction type bar feed mechanism similar to that disclosed in U.S. Pat. No. 2,146,583 and using an accurately positioned stop block, the commonly expected accuracy of positioning of bar stock is only within ±0.005 inch on successive feed cycles. It should be understood that the feed tolerances set forth above are for purposes of illustration only and that the dimensional feed tolerances associated with either bar feed mechanism may vary.

By biasing the cam or roller 172 against one side of the cam track 174, positive movement of the slide assembly 88 through successive feed strokes of a predetermined length is obtained to accurately position a predetermined length of bar stock in the work area 26 without the use of a turret mounted stop block. Elimination of the turret mounted stop block enables all of the mounting positions on the turret 30 (FIG. 1) to be utilized to hold tools 28. Of course, this provides a tool engineer with greater latitude in tool arrangement and design. In addition, elimination of the turret mounted stop block eliminates wasted turret indexing time and enables a tool 28 to be advanced toward the cutting position while the bar stock is being fed. During one specific set of operating conditions, the cycle time for a Brown and Sharpe No. 00 size Automatic Screw Machine was reduced by approximately 25 percent by the use of a bar feed mechanism constructed in accordance with the present invention. However, it should be understood that the reduction in cycle time set forth above is merely illustrative and that the saving obtained in cycle time by using the bar feed mechanism 20 will vary with the configuration of the piece being machined, tool arrangement and design, and many other factors.

Before a feed stroke is initiated by the bar feed mechanism 20, it is necessary for the spindle chuck 24 to be in the open condition of FIG. 6, with the collet fingers 84 disengaged from the bar stock 22. Similarly, the spindle chuck 24 should be in the closed condition of FIG. 3 before a return stroke is initiated by the bar feed mechanism 20. To positively maintain the desired relationship between the chuck actuator assembly 66 and bar feed mechanism 20, the drum cam 176 is provided with a first track 174 to effect reciprocating movement of the gripper assembly 36 through feed and return strokes and a second track 210 which effects actuation of chuck actuator assembly 66. The chuck actuator assembly 66 includes an actuator lever 212 which is pivotally mounted at 214 on the base 12 of the machine tool 10. A cam follower 218 is provided on one end portion of the actuator lever 212 and engages the cam track 210. A connector roller 220 at the opposite end of the lever 212 engages a circular groove 224 formed in the sleeve 68. Therefore, upon pivoting movement of the actuator lever 212 about the connection 214, due to interaction between the cam track 210 and cam follower 218, the sleeve 68 is moved between the actuated position shown in FIG. 2 in which the chuck 24 is held closed and the released condition of FIG. 5 in which the chuck 24 is open. Since the cam tracks 210 and 174 are formed in the same cam drum member 176, the chuck actuator assembly 66 and drive assembly 94 for the slide 88 are always actuated in the desired sequence relative to each other.

During operation of the machine 10, it is important that a return stroke is not initiated by the bar stock feed assembly 20 until after the spindle chuck 24 has closed to securely grip the bar stock. Thus, only after the slide assembly 88 has been moved forwardly through a feed stroke and the chuck 24 has been closed is the gripper assembly 36 opened and a return stroke initiated. To maintain this predetermined sequential relationship between the closing of the chuck 24, opening of the gripper assembly 36, and initiation of a return stroke, a sensor assembly 230 is associated with the cam 176 (see FIG. 7) and is actuated only after the chuck 24 has closed at the completion of a feed stroke. Actuation of the sensor assembly 230 effects activation of the actuator assembly 32 to open the gripper assembly 36 prior to initiation of a return stroke.

Figure 7:
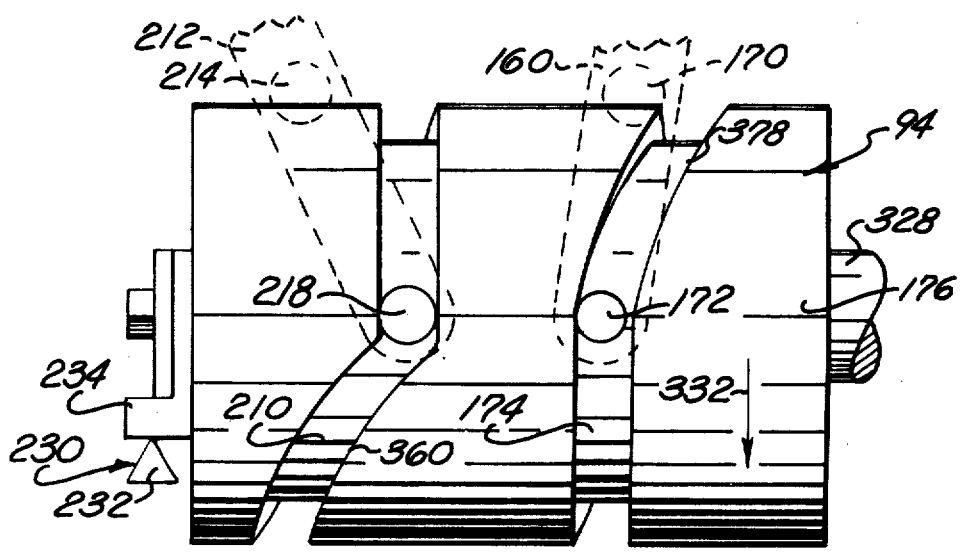
FIG. 7 is an illustration of a cam for controlling operation of the spindle chuck between the opened and closed conditions and the movement of the gripper assembly through feed and return strokes.

The sensor assembly 230 includes a valve, indicated schematically at 232 in FIG. 7, which is actuated at the proper time in the feed cycle by a lug 234 connected to the cam 176. Since the lug 234 is disposed in a fixed relationship with the cam tracks 210 and 174, the lug 234 always actuates the valve 232 when the slide assembly 88 has reached the end of a feed stroke and after the chuck 24 has been closed by the actuator assembly 66. This insures that the gripper assembly 36 is opened prior to initiation of a return stroke and after the chuck 24 has closed.

During continued operation of the machine tool 10, it is contemplated that the length of the bar stock 22 may be reduced so that the remnant end portion of the bar stock is shorter than the length of bar stock to be fed to the work area during the next succeeding cycle of operation of the machine tool. When this occurs, the gripper assembly 36 will be moved axially rearwardly of the trailing end of the bar stock 22 during the return stroke of the last feed cycle. Therefore, when the actuator assembly 32 is activated to operate the gripper assembly 36 to the closed condition immediately prior to the next succeeding feed cycle, the gripper assembly will not engage the bar stock 22.

When the gripper assembly 36 is closed without bar stock in the gripper assembly, the piston 46 moves through a relatively long forward stroke and moves the annular flanged end portion 122 of the gripper actuator tube 50 into abutting engagement with the flanged end portion 126 of the bar feed tube 62. Due to the absence of bar stock in the gripper assembly 36, there is nothing to prevent the gripper fingers 42 from being pressed inwardly through a relatively large distance toward each other. Of course, this reduces the opening 44 to a size which is smaller than the cross sectional area of the bar stock 22.

When the gripper assembly 36 is operated to the closed condition without a piece of bar stock between the gripper fingers 42, a detector assembly 240 (FIG. 2) is actuated to initiate suitable control functions. The detector assembly 240 includes a sensor valve 244 which is mounted on the cylinder 100 and an actuator member or screw 246 which is mounted on a support member 248 connected to the outer end of the piston rod 154. Upon movement of the piston 46 through a relatively large stroke, which occurs when the gripper assembly 36 is closed in the absence of a piece of bar stock between the gripper fingers 42, the screw 246 opens the valve 244 to exhaust a conduit 250 to atmosphere. The conduit 250 is connected with a relay valve 252 (FIG. 1) which is actuated in response to a reduction in pressure in the conduit 250. Actuation of the relay valve 252 pressurizes a line 254 and activates a clutch actuator assembly 256 to ultimately interrupt or stop operation of the machine tool 10. In accordance with the present invention, the loader mechanism 31 will then be activated to feed a next succeeding piece of bar stock into the feed mechanism 20.

A control system 300 for the bar stock feed mechanism 20 initiates a bar feed operation upon completion of a machining operation. The control system 300 includes a master control assembly 302 which, in the case of a numerically controlled machine tool, includes a tape reader and known control apparatus for initiating control functions in accordance with a program punched in the tape. However, it is contemplated that the master controls 302 could be of a mechanical nature and include suitable trip dogs and control cams such as are shown in the aforementioned text on automatic screw machines published by the Brown and Sharpe Mfg. Co.

Immediately prior to the initiation of a bar feed operation, the actuator assembly 32 is activated to close the gripper assembly 36. Accordingly, while the bar stock 22 is being machined, the master controls 302 activate an actuator assembly 304 to move an actuator rod 306 and open a bleed valve 308 to atmosphere. Opening the bleed valve 308 to atmosphere reduces the pressure in a line 312 to one side of a known threeway pressure-operated valve 314. The valve 314 has a spool which is shifted within a housing in response to a change in fluid pressure conducted to either side of the housing. Thus, upon operation of the bleed valve 308 to the open condition, the valve spool is shifted to the right and air under pressure is ported from a supply conduit 318 through the conduit 106 to one end of the piston chamber 102. Conducting high pressure air to the chamber 102 causes the piston 46 to move toward the right (as viewed in FIG. 2) to operate the gripper assembly 36 from the open condition of FIG. 3 to the closed condition of FIG. 6 prior to the initiation of a bar feed operation.

After the gripper assembly 36 has been closed and machining operations on the portion of the bar stock 22 in the work area 26 completed, the drum cam 176 is rotated to initiate a bar feed operation. Thus, upon completion of machining operations, the master controls 302 transmit a signal to a clutch actuator assembly 320 (FIG. 1) to effect engagement of a clutch assembly 322. The clutch assembly 322 is connected with a main drive shaft 324 for the machine 10 and is drivingly connected with an input shaft 328 to the drum cam 176. Therefore, on engagement of the clutch assembly 322, the drum cam 176 is rotated to actuate the chuck operator assembly 66 from the engaged condition of FIG. 2 to the released condition of FIG. 5 during the first 90 degrees of rotational movement of the drum cam 176 from the position shown in FIG. 2 and in the direction of the arrow 332. As this occurs, a portion 334 of the cam track 210 pivots the actuator lever 212 in a clockwise direction to operate the spindle chuck 24 from the closed condition indicated at 338 on a curve 340 (FIG. 8) to the open condition indicated at 342. During the first 90 degrees of rotation of the drum cam 176, the gripper assembly 36 remains in the closed condition, as shown by a curve 344 in FIG. 8, and the slide assembly 88 remains in the retracted position of FIG. 2, as shown by a curve 348 of FIG. 8.

As the drum cam 176 is rotated from the 90° position to the 180° position, the slide assembly 88 is moved from the retracted position to the extended position to move the gripper assembly 36 through a feed stroke. Thus, a portion 352 of the cam track 174 (FIG. 5) pivots the actuator lever 160 from the position shown in FIG. 2 to the position shown in FIG. 5, during the second 90 degrees of rotation of the cam 176. During this movement of the slide assembly 88 from the extended position to the retracted position, indicated by the portion 356 of the curve 348 (FIG. 8), the gripper assembly 36 remains in the closed position (see curve 344 in FIG. 8) and the spindle chuck 24 remains open (see curve 340).

During somewhat less than the next 90 degrees of rotation of the drum cam 176, the spindle chuck 24 is operated to the closed condition. Thus, the portion of the cam track 210 designated 360 in FIG. 5 pivots the actuator lever 212 in a counterclockwise direction to operate the chuck actuator assembly 66 from the released condition of FIG. 5 to the engaged condition of FIG. 2 as the drum cam 176 is rotated through slightly less than 90 degrees from the position shown in FIG. 5. Of course, this operates the spindle chuck 24 from the open condition to the closed condition, as indicated by the portion 362 of the curve 340 (see FIG. 8).

When the chuck 24 has closed at the end of the feed stroke, the cam 176 has rotated through slightly less than 270 degrees and is in the position shown in FIG. 7. The valve 232 in the sensor assembly 230 is now opened by the lug 234 to initiate opening of the gripper assembly 36. Operation of the valve 232 ports fluid through a conduit 366 (FIG. 1) to the valve 314 (see FIG. 1) to shift the valve spool and connect the conduit 106 with an exhaust conduit 370. Connecting conduit 106 with the exhaust conduit 370 enables the return spring 110 to move the piston 46 to the left from a position shown in FIG. 5 to the position shown in FIG. 2. Of course, this leftward movement of the piston 46 results in the gripper assembly 36 being operated from the closed condition to the open condition. This operation of the gripper assembly is shown by the portion 374 (FIG. 8) of the curve 344.

During rotation of the drum cam 176 from the 270° position to the 360° position, the portion 378 (FIG. 2) of the cam track 174 pivots the actuator lever 160 to move the slide assembly 88 and gripper 36 through a return stroke. This movement of the slide assembly is indicated by the portion of the curve 348 which is designated 382 in FIG. 8. After rotation of the drive shaft 328 for the drum cam 176 through one complete revolution, the clutch actuator 320 (see FIG. 1) effects operation of the clutch assembly 322 to the disengaged condition to prevent further rotation of the drum cam by the main drive shaft 324.

It is contemplated that during setting up of the machine tool 10, it may be desirable to override the normal mode of operation of the control system 300. Accordingly, a pair of manual override valves 390 and 392 are provided in the lines 366 and 312 to enable the valve 314 to be operated to effect operation of the gripper assembly 36 between the open and closed conditions.

The general construction and mode of operation of the bar feed mechanism 20 have been claimed in my aforementioned copending application. In accordance with one aspect of the present invention, the loader mechanism 31 is utilized in combination with the bar stock feed mechanism 20 to move a piece of bar stock into the feed mechanism when the preceding piece of bar stock has been used up or exhausted. The loader mechanism 31 (see FIG. 9) is disposed immediately behind the bar feed piston and cylinder assembly 100. The loader mechanism 31 includes a transfer mechanism 410 (see FIGS. 9, 10, and 11) which simultaneously moves one piece of bar stock from a magazine 412 to an intermediate station 414 and another piece of bar stock from the intermediate station to a loading station 416 (FIG. 11). Once the piece of bar stock has been movd to the loading station 416, it is registered relative to the feed mechanism 20 and spindle chuck 24 of the machine tool 10 by a compensating cylinder assembly 420 (FIG. 10) which presses a leading end surface 421 of the bar stock against a stop member 422 in the manner illustrated in FIG. 15. After the stop member 422 has been retracted, a pusher or main cylinder assembly 426 (FIG. 10) is operated to push the leading end portion of the bar stock from the loader mechanism 31 into the open gripper assembly 36 and spindle chuck 24 (FIG. 3).

In the illustrated embodiment of the loader mechanism 31, the main cylinder assembly 426 is activated to move a piece of bar stock into both the gripper assembly 36 and the spindle chuck 24 when they are in their open conditions. However, it is contemplated that the main cylinder assembly 426 may be operated through a stroke which is of sufficient length to move the bar stock into only the gripper assembly 36. When this is done, the gripper assembly 36 will be closed and moved through a feed stroke to feed a short length of bar stock to the spindle chuck 24 and work area in the manner previously explained. With either of these modes of operation, the positive registering of the leading end surface 421 of the bar stock against the stop member 422 prior to loading of the bar stock into the feed mechanism 20 enables the bar stock to be accurately positioned relative to the spindle chuck 24 and gripper assembly 36 by the loader mechanism 31.

During each loading cycle, the transfer mechanism 410 engages a piece of bar stock 22 in the magazine 412 and moves it to the intermediate station 414 (FIGS. 11 and 12). On the next succeeding loading cycle, this piece of bar stock is moved from the intermediate station 414 to the loading station 416 as a succeeding piece of bar stock is moved from the magazine 412 to the intermediate station. The magazine 412 is advantageously provided with a pair of end pieces 428 which axially position the pieces of bar stock for engagement by the transfer mechanism 410.

Upon initiation of a loading cycle, a transfer motor or piston and cylinder assembly 430 is retracted from the extended condition of FIG. 12 to pivot a slotted transfer tube 434 and one or a number of axially spaced arcuate transfer blocks 436 from an initial bar receiving position (FIG. 11) to an actuated bar delivery position (FIG. 12). As the transfer tube 434 is rotated through approximately 30° from the initial position to the actuated position, a piece of bar stock 22a is moved from the intermediate station 414 to the loading station 416 by the slotted transfer tube 434. Simultaneously with movement of the piece of bar stock 22a to the loading station 416, a next succeeding piece of bar stock 22b is moved from the magazine 412 to the intermediate station 414 by the transfer block 436.

The transfer tube 434 has an elongated cylindrical configuration and is provided with a rectangular slot 440 which extends from one end to the other of the transfer tube. The slot 440 is aligned with a downwardly sloping ramp 442 at the intermediate station 414 when the transfer mechanism 410 is in the initial position of FIG. 11. Since the slot 440 is aligned with the downwardly sloping ramp 442, a piece of bar stock at the intermediate station 414 (i.e., the piece of bar stock designated 22a in FIGS. 11 and 13) will enter the slot 440 under the influence of gravity. The piece of bar stock 22a then rests on a side surface 446 of the slot 440 (FIG. 13). When the motor 430 is retracted, the transfer tube 434 is pivoted in a clockwise direction about its central longitudinally extending axis to move the slot 440 from the intermediate station 414 to a point above the loading station 416. Of course, this movement of the tube 434 transfers the piece of bar stock 22a from the intermediate station 414 to the loading station 416, where the piece 22a again drops under the influence of gravity.

The loading station 416 is formed by a generally U-shaped, longitudinally extending recess or slot 450 in a cylindrical support bar 452. The recess 450 is axially aligned with the feed mechanism 20 and spindle chuck 24. The support bar 452 is connected to a pair of base members 454 (see FIGS. 9 and 13) and is disposed in a coaxial relationship with the transfer tube 434 so that the transfer tube can be rotated about the support bar by the piston and cylinder assembly 430. When the piece of bar stock 22a drops into the recess 450 (see FIG. 12), the piece of bar stock 22a is axially aligned with the center of the gripper assembly 36 in the bar stock feed mechanism 20 and the spindle chuck 24.

The entire loader mechanism 31 can be adjusted vertically relative to the feed mechanism 20 to enable pieces of bar stock of different sizes to be axially aligned with the gripper assembly 36 and spindle chuck 24 when the pieces of bar stock are at the loading station 416. In addition, it is contemplated that the support bar 452 could be replaced with a support bar having a U-shaped recess 450 of a different size to accommodate larger or smaller pieces of bar stock. Of course, the recess 450 could have a cross sectional configuration which is different from the illustrated configuration.

Simultaneously with movement of the bar stock 22a to the loading station 416 by the transfer tube 434, a next succeeding piece of bar stock 22b is moved from the magazine 412 upwardly onto the support ramp 442 at the intermediate station 414 by the transfer blocks 436. The transfer blocks 436 (FIG. 11) are fixedly connected to the transfer tube 434 and have a pickup surface 460 which engages a piece of bar stock 22b at the magazine discharge opening 462 and lifts the piece of bar stock 22b upwardly to the intermediate station 414. An upper or blocking surface 466 cooperates with a bottom surface 468 of the magazine 412 so that the discharge opening 462 is of sufficient size to enable only one piece of the bar stock at a time to pass from the magazine 412 to the intermediate station 414. To enable the loader mechanism 31 to load different sizes of bar stock, a blocking member 472 can be replaced with a different blocking member which will provide a different size of discharge opening 262. It is contemplated that the blocking member 472 may be mounted in such a manner that its position relative to the bottom surface 468 of the magazine 412 could be adjusted to vary the size of the discharge opening 462. Of course, when the size of the bar stock 22 is varied, the size of the transfer block 436 must also be varied so that the pickup surface 460 will have the proper length for the discharge opening 462.

When the transfer mechanism 410 has been operated from the initial position of FIG. 11 to the actuated position of FIG. 12, the pickup surface 460 is in alignment with the ramp 442 at the intermediate station 414. The piece of bar stock 22b can then roll down the pickup surface 460 and ramp 442 into engagement with a cylindrical outer surface 476 of the transfer tube 434 (FIG. 12). When the piston and cylinder assembly 430 is extended and the transfer tube 434 rotated in a counterclockwise direction from the position shown in FIG. 12 to the position shown in FIG. 11, the piece of bar stock 22b will roll downwardly into the slot 440 in the transfer tube 434. This positions the piece of bar stock 22b for movement to the loading station 416 after the piece of bar stock 22a has been moved from the loading station during operation of the machine tool 10.

The piston and cylinder 430 is connected with the transfer tube 434 by a connector member 480 which is fixedly secured to the transfer tube. Therefore, operation of the piston and cylinder assembly 430 rotates the transfer tube 434 and transfer block 436 to sequentially move pieces of bar stock from the magazine 412 to the intermediate station 414 and from the intermediate station 414 to the loading station 416. It should be noted that as a piece of bar stock is moved from the magazine 412 to the intermediate station 414 and from the intermediate station to the loading station 416, the support bar 452 remains stationary with the recess 450 in continuous axial alignment with the feed mechanism 20 and spindle chuck 24. In addition, any tendency for the transfer mechanism 410 to jam is minimized, since there is only one piece of bar stock at a time at the intermediate station 414.

Movement of the transfer tube 434 under the influence of the piston and cylinder assembly 430 is limited by a stop block 488 (see FIG. 13) which is received within an arcuate slot 490 formed in the transfer tube 434. The stop block 488 is fixedly connected with the support bar 452 and the base member 454 by a suitable connection 494. When the piston and cylinder assembly 430 is in its extended condition (see FIG. 11), a stop surface 496 (FIG. 13) formed at one end of the slot 490 is disposed in abutting engagement with the stop block 488. Similarly, when the piston and cylinder assembly 430 has been retracted to pivot the transfer tube 434 to the position shown in FIG. 12, a stop surface 498 at the opposite end of the slot 490 is disposed in abutting engagement with the stop block 488. The slot 490 and stop block 488 are sized so that the stop block holds the transfer tube 434 against axial movement relative to the support bar 452. Although only a single stop block 488 has been illustrated, it should be understood that there are a pair of stop blocks each of which is associated with one of base members 454.

Figure 14:
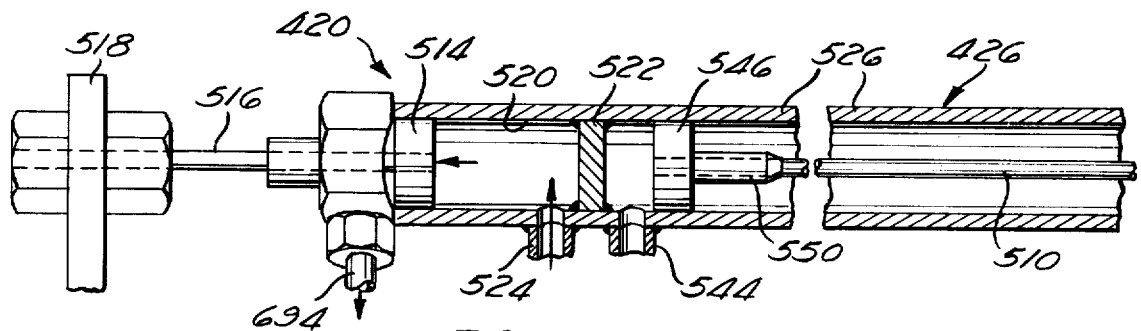
FIG. 14 is an enlarged, fragmentary, sectional view of the area 14—14 of FIG. 10, illustrating the relationship between the main cylinder and the compensating cylinder, which has been activated to register a piece of bar stock at the loading station.
Figure 15:
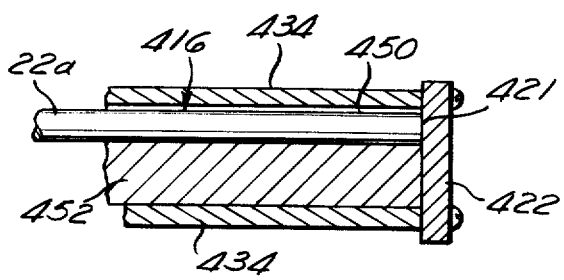
FIG. 15 is an enlarged, sectional view of the area 15—15 of FIG. 10, illustrating the registration of the leading end of a piece of bar stock with the feed mechanism of FIGS. 1 and 2.

After the piece of bar stock 22a has been moved from the intermediate station 414 to the loading station 416, the bar stock is registered relative to the gripper assembly 36 and spindle chuck 24 by operation of the compensating cylinder assembly 420. When the compensating cylinder assembly 420 is actuated from the retracted condition of FIG. 10 to the extended condition of FIG. 14, a push rod 510 of the main cylinder assembly 426 presses the leading end surface 421 of the bar stock 22a against the stop member 422 (FIG. 15). The stop member 422 is spaced a predetermined distance from the spindle chuck 24 and gripper assembly 36 so that engagement of the leading end portion of a piece of bar stock 22a registers it relative to the spindle chuck 24 and gripper assembly 36.

The compensating cylinder assembly 420 includes a piston 514 (FIGS. 10 and 14) having a piston rod 516 which is fixedly connected with a base member 518. The piston 514 is disposed within a cylindrical operating chamber 520 which is separated from the main piston and cylinder assembly 426 by a circular wall 522. When fluid under pressure is conducted through conduit 524 to the head end of the operating chamber 520, a cylinder member 526 is moved toward the right from the position shown in FIG. 10 to the position shown in FIG. 14. This rightward movement of the cylinder member 526 moves the piston rod 510 of the main cylinder assembly 526 into abutting engagement with the trailing end portion of a piece of bar stock 22a at the loading station 416. Continued rightward movement of the cylinder member 526 causes the piston rod 510 to move the leading end portion of the piece of bar stock 22a into abutting engagement with the stop member 422 (see FIG. 15). In this manner, the leading end 421 of a piece of bar stock 22a at the loading station 416 is located in a predetermined position relative to the gripper assembly 36 and spindle chuck 24 prior to being moved from the loader mechanism 31 into the feed mechanism 20.

Once the leading end surface 421 of the bar stock 22a has been pressed against the stop member 422 by the piston rod 510, pressure conducted through the conduit 524 to the head end of the compensating cylinder chamber 520 is ineffective to move the cylinder member 526 and bar stock 22a relative to the machine tool 10. The gripper assembly 530 is then closed to securely clamp the cylinder member 526. The gripper assembly 530 includes a piston and cylinder-type motor 532 which is actuated to operate a clamp 534 to securely grip the cylinder member 526 to hold it against movement relative to the base member 518. Since the main cylinder assembly 426 has a predetermined stroke, the leading end portion of the bar stock 22a is moved through a predetermined distance when the main cylinder assembly is extended to move the piece of bar stock 22a into the feed mechanism 20.

The position to which the piece of bar stock 22a is moved by the main cylinder assembly 426 is the same regardless of the length of the piece of bar stock 22a. This is because the main cylinder assembly 426 has a predetermined stroke and the leading end 421 of the bar stock 22a is registered in a predetermined position relative to the bar feed mechanism 20. Therefore, when the main cylinder assembly 426 is extended through its predetermined operating stroke, the piece of bar stock 22a is moved through a predetermined distance from the position shown in FIG. 15 into the bar feed mechanism 20.

Before the leading end of the registered piece of bar stock 22a can be moved from the loader mechanism 31 to the bar feed mechanism 20 by operation of the main cylinder assembly 426, the stop member 422 must be moved from the blocking position of FIG. 12 and FIG. 15 to the retracted position of FIGS. 10 and 11. Thus, before the main cylinder assembly 426 is extended, the transfer piston and cylinder assembly 430 is extended to move the connector member 480 in a counterclockwise direction from the position shown in FIG. 12 to the position shown in FIG. 11. This moves the stop member 422 away from the end of the registered piece of bar stock 22a. Once the stop member 422 has been moved to the retracted or non-blocking position of FIG. 11, the registered piece of bar stock 22a can be moved longitudinally along the U-shaped slot 450 in the support bar 452 to move the leading end portion of the bar stock into the feed mechanism 20.

To move the leading end portion of the bar stock 22a into the feed mechanism 20, the main cylinder assembly 426 is extended from the retracted condition of FIG. 10. This is accomplished by conducting fluid under pressure through a conduit 544 to the head end portion of the main cylinder assembly 426. As the piston 546 moves through a predetermined stroke toward the right (as viewed in FIG. 10) away from the wall 522, the pusher or piston rod 510 pushes the leading end portion of the registered piece of bar stock 22a from the loader mechanism 31 into the feed mechanism 20. However, it should be understood that the length of the bar stock 22a is substantially greater than the stroke of the piston 546 so that the trailing end portion of the bar stock 22a remains in the loader mechanism 31. In one specific embodiment of the invention, the bar stock 22 and support rod 452 had a length of approximately twelve feet and the piston 546 moved through a stroke of approximately thirteen inches. Of course, the foregoing dimensions are to be considered as merely being illustrative and may be considerably different when the loader mechanism 31 is used in different environments.

When the piston 546 reaches the end of a stroke, a cam 550 actuates a bleed valve 552 to initiate a retraction of the main cylinder assembly 526 and the compensating cylinder assembly 420. At the same time, the gripper piston and cylinder assembly 532 is extended so that the gripper assembly 530 releases the cylinder member 526 for axial movement toward the left from the position shown in FIG. 14 to the position shown in FIG. 10. During subsequent operation of the machine tool 10, the trailing end portion of the bar stock 22a is rotated in the U-shaped recess 450 (see FIG. 11), which is closed at its upper end by the transfer tube 434. Of course, as the feed mechanism 20 is operated through feed strokes in the manner previously explained, the length of the piece of bar stock disposed in the recess 450 will be gradually reduced until the trailing end portion of the bar stock 22a is moved out of the loader mechanism 31.

Figure 16:
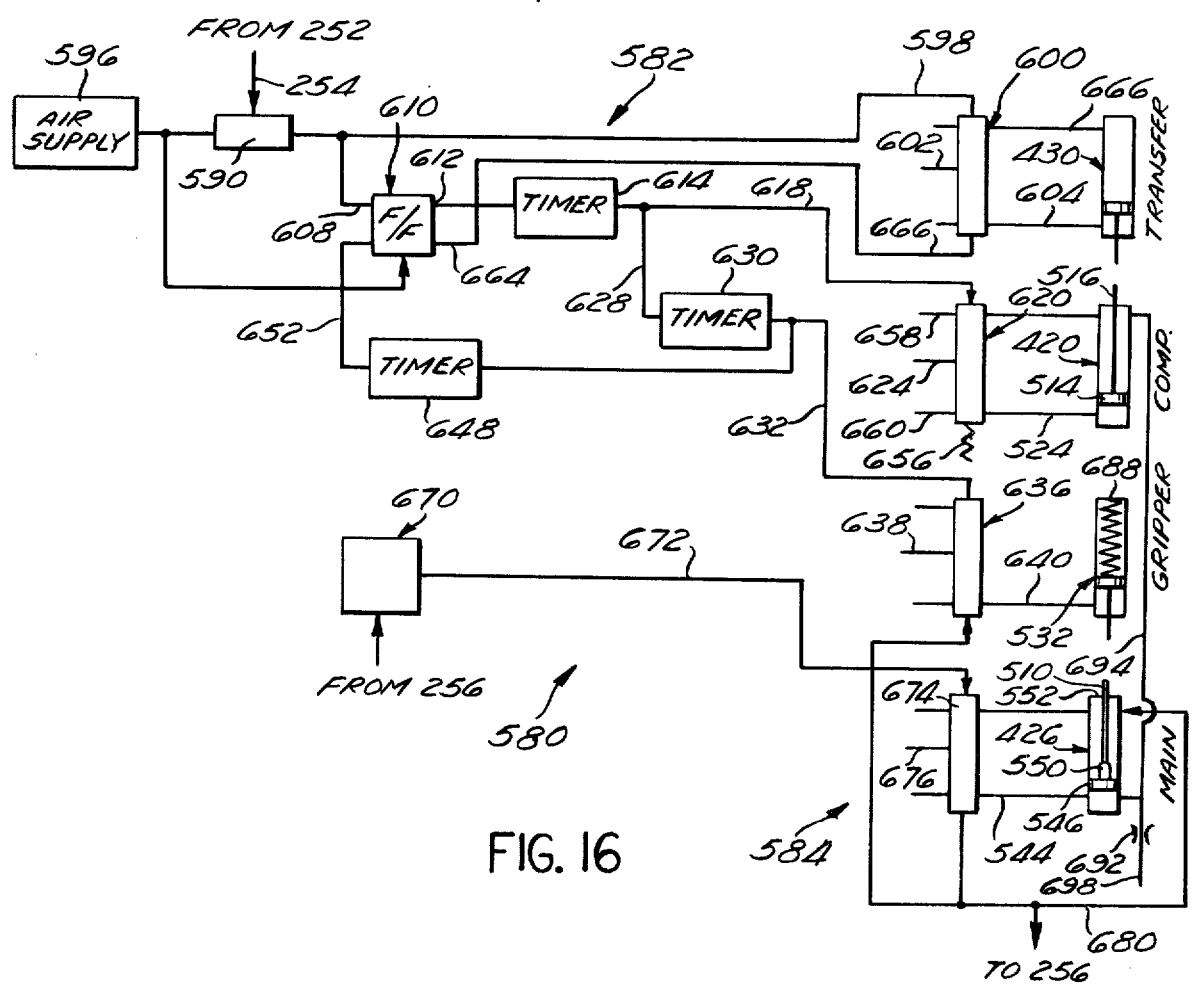
FIG. 16 is a schematic illustration of control circuitry for effecting operation of the loader mechanism.

A fluid control circuit 580 for initiating operation of the loader mechanism 31 in the desired sequential relationship with operation of the spindle chuck 24 and feed mechanism 20 is illustrated in FIG. 16. The control circuit 580 includes a transfer subcircuit 582 which is activated in response to operation of the gripper assembly 36 (FIG. 4) from the open condition to the closed condition without a piece of bar stock in the gripper assembly. When this occurs, the transfer subcircuit 582 is activated to effect the transfer of a piece of bar stock from the intermediate station 414 to the loading station 416. In addition, activation of the transfer subcircuit 582 initiates operation of the compensating cylinder assembly 420 to register the leading end portion of the bar stock against the stop 422. Thereafter, the transfer subcircuit 582 effects operation of the gripper piston and cylinder 532 to hold the cylinder 526 against longitudinal movement once the bar stock has been registered. While the foregoing operation of the transfer subcircuit 582 is occurring, the control system 300 effects operation of the spindle chuck 24 and gripper assembly 36 to their open conditions. A load subcircuit 584 (FIG. 16) is then activated to effect operation of the main cylinder assembly 426 and movement of the registered piece of bar stock into the open spindle chuck 24 and gripper assembly 36. Under certain operating conditions, it is contemplated that the main cylinder assembly 426 will be activated to move the registered piece of bar stock into only the gripper assembly 36 rather than into both the gripper assembly 36 and spindle chuck 24.

During operation of the machine tool 10, the bar feed mechanism 20 is operated to feed an incremental length of bar stock to the work area at the end of each machining cycle. After a number of feed operations, the length of the remaining piece of bar stock will be insufficient for the next succeeding machining operation. When this occurs, the gripper assembly 36 is closed without a piece of bar stock between the fingers 42 (FIG. 4), and the detector assembly 240 (FIGS. 1 and 2) is operated in the manner previously explained to initiate a loading cycle. During the loading cycle, the bar feed mechanism 20 is operated through a cycle which is different from the previously described feed cycle.

When the length of the piece of bar stock remaining at the end of a machining cycle is less than is required for the next cycle, the piston 46 (FIG. 2) moves through a relatively long forward stroke so that the gripper fingers 42 (FIG. 4) in the gripper assembly 36 are moved inwardly through a relatively large distance toward each other. As this occurs, the sensor assembly 240 is actuated to exhaust the conduit 250 (FIG. 1) and operate the relay valve 252. Operation of the relay valve 252, as explained below, ultimately effects operation of the main clutch actuator assembly 256 (FIG. 1) to interrupt the normal repetition of machining cycles.

Venting of line 250 by sensor 240, indicating insufficient stock, also causes the gripper assembly 36 to be reopened by operation of a control valve 681 (FIG. 1). The control valve 681 is effective to exhaust the line 106 and the chamber 102 to thereby allow the gripper 36 to reopen.

Operation of the relay valve 252 also effects actuation of a control valve 590 in the transfer subcircuit 582 (see FIG. 16). Actuating the control valve 590 in the transfer subcircuit 582 effects operation of the load cylinder 430 to transfer a piece of bar stock from the intermediate station 414 to the loading station 416. Thus, a signal from the relay valve 252 closes the control valve 590 to conduct air from a supply line 596 through a conduit 598 to a pressure-responsive valve 600. This high pressure air causes the valve 600 to port air under pressure from a supply line 602 to a conduit 604 connected to the rod end of the normally extended load cylinder 430. The air pressure retracts the load cylinder 430 to pivot the transfer tube 434 and move a piece of bar stock 22a from the intermediate station 414 to the now empty loading station 416. Of course, as the piece of bar stock 22a is transferred to the loading station 416, the next succeeding piece of bar stock 22b is transferred to the intermediate station 414 in the manner previously explained.

In addition to causing air under pressure to be conducted to the valve 600, operation of the valve 590 ports air to an inlet 608 to set a flip-flop type valve 610 to port fluid from the inlet 608 to an outlet 612. Air from the outlet 612 is conducted through a delay timer 614 a predetermined time period after the valve 590 is operated. This time period is sufficient to enable the load cylinder 430 to be retracted to move the piece of bar stock 22a to the loading station 416. After this time period, air under pressure is conducted through a conduit 618 through a pressure-responsive valve 620. This effects actuation of the pressure-responsive valve 620 to port air from a supply conduit 624 to the conduit 524 which is connected with the head end of the compensating cylinder assembly 420. This effects operation of the compensating cylinder 420 from the retracted position of FIG. 10 to the extended position of FIG. 14 to press the leading end portion of the piece of bar stock 22a against the stop member 422 (FIG. 15).

After the piece of bar stock 22a has been registered against the stop member 422, the gripper cylinder 532 is retracted to operate the gripper assembly 530 to hold the cylinder 526 against movement. Accordingly, air is conducted through conduit 628 to a timer 630 which after a predetermined time delay, ports air through a conduit 632 to operate a valve 636. The actuated valve 636 ports air from a supply conduit 638 to a conduit 640 leading to the rod end of the gripper cylinder assembly 532. This causes the gripper piston assembly 532 to retract to operate the gripper assembly 530 to clamp the cylinder 526 against axial movement.

Once the gripper assembly 530 has been operated to clamp the cylinder 526 against axial movement, the compensating cylinder assembly 420 can be relaxed or exhausted so that there is no longer any pressure urging the cylinder 526 to press the leading end portion of the bar stock 22a against the stop member 422. Thus, a timer valve 648 is operated a predetermined time period after operation of the timer valve 630 and the gripper assembly 530 to actuate the flip-flop type valve 510 from its initial condition to a secondary condition. Operating the flip-flop valve 510 to its secondary condition disconnects air pressure from the outlet 612 so that air pressure is no longer applied through the timer valve 614 to the pressure-responsive valve 620. This enables a spring 656 to move the valve 620 to a neutral position in which both end portions of the piston and cylinder 420 are exhausted through conduits 658 and 660. Although the application of air pressure to the gripper control valve 636 is interrupted, the valve 636 is not spring-biased. Therefore, the gripper control valve 620 merely moves to a neutral position in which fluid flow to and from the piston and cylinder assembly 532 is blocked and the gripper assembly 530 remains in the closed or clamped condition in which it holds the cylinder member 526 against movement.

After the leading end of a piece of bar stock 22a has been registered by being pressed against the stop member 422 under the influence of compensating cylinder assembly 420, the stop member 422 is moved out of the way of the leading end portion of bar stock 22a so that it can be moved into the feed mechanism 20. Thus, when the flip-flop valve 610 is actuated, fluid under pressure is ported through an outlet 664 through a conduit 666 leading to the control valve 600. This causes the control valve 600 to connect the head end of the load cylinder assembly 420 with the source of air pressure 602 through a conduit 668 to operate the load cylinder 430 to the extended condition of FIG. 11. Of course, this moves the stop member 422 out of the way of the end portion of the registered piece of bar stock 22a so that the bar stock can be moved into the feed mechanism 20 under the influence of the main cylinder assembly 426.

Pressure in line 254 from the control relay 252, developed when the sensor 240 determines insufficient bar material in the machine, conditions a control sensor valve 669 (FIG. 1) to stop the machine with the chuck 24 open to receive the forward end of a new bar. Pressure in the line 254 biases a spool 667 (FIG. 2) of a known configuration in the valve 669 towards a position at which the machine is stopped. Movement of the spool 667 to the machine stopping position (to the right in FIG. 2) under the influence of the biasing force of pressure in the line 254 is normally restrained by a surface 671 fixed relative to the feed slide 88, such as on an extension member 673.

Figure 8:
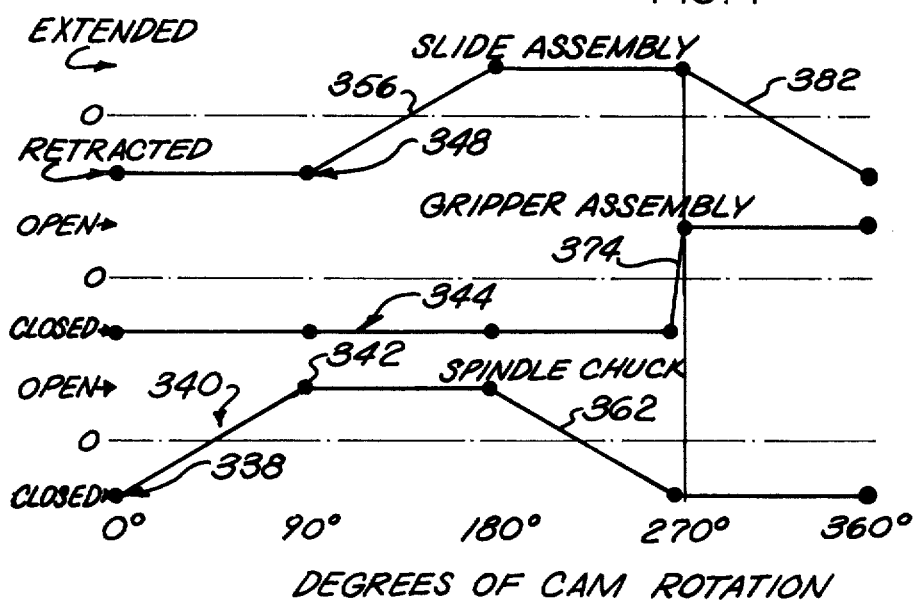
FIG. 8 is a graph depicting the relationship between rotation of the cam of FIG. 7, operation of the bar stock feed mechanism through feed and return strokes, opening and closing of the gripper assembly, and opening and closing of the spindle chuck.

The feed slide 88 and extension 673 move rightwardly, and thereby release the pressure-biased spool 667 (FIG. 5) only when the chuck 24 is open, as may be understood by reference to FIG. 8. As in a normal machining cycle (where there is sufficient stock to make another piece), the chuck 24 is opened by the master controls 302. Stated in other words, the conditioned sensor valve 669 thus determines when the chuck 24 is open by sensing the position of the extension 673. Movement of the spool 667 to the right causes pressurized fluid to pass from the supply 318 through a line 675 to the main clutch actuator 256 to stop the machine.

Since the spool 667 is only pressurized or conditioned when there is insufficient bar stock in the machine, the valve 669 is not subjected to constant actuation and harmful wear each time the feed slide 88 advances and the chuck 24 opens during production operations. The extension 673 moves the spool 667 to the left only once after the machine is restarted, since the spool is normally not biased to the right. The valve 669 is conveniently mounted stationarily with respect to the machine by fixing it to a suitable portion of the loader 31 at the rearward end of the feeder 20.

When the main clutch actuator 256 is actually signaled through the line 675 to stop the machine by the chuck opening sensor 669, a valve 670 in the loading control circuit 580 is energized to effect operation of the main or pusher cylinder assembly 426 to move the registered piece of bar stock 22a into the open spindle chuck 24 and gripper assembly 36. The valve 670 is connected to the circuitry of the main clutch actuator 256 such that it is not energized until the actuator is energized so that the bar stock is not loaded before the chuck is opened. The valve 670 has an internal time delay of known construction to assure that the functions of the load transfer, compensating and gripper cylinders 430, 420, 532 have been completed before the main load cylinder 426 is energized. The valve 670, through line 672, effects operation of a valve 674 to connect an air supply conduit 676 with the conduit 544 leading to the head end of the main cylinder assembly 426. This causes the piston 546 (see FIG. 10) to move away from the wall 522 to move the push rod 510 forwardly through a predetermined feed stroke. The feed stroke is of a length such that a leading end of the registered piece of bar stock 22a moves through the open gripper assembly 36 and chuck 24 into the work area.

Once the piston 546 reaches the end of this predetermined feed stroke, the cam 550 (see FIG. 10) actuates a bleed valve 552. The bleed valve 552 connects the conduit 680 to atmosphere and effects operation of the valve 674 to conduct air pressure to the rod end portion of the main piston and cylinder assembly 426 and to connect the head end portion of the main piston and cylinder assembly 426 with atmosphere. Of course, this causes the main piston and cylinder assembly 426 to be retracted back to the position shown in FIG. 10, with the piece of bar stock 22a extending for a predetermined distance from the open spindle chuck 24.

In addition to effecting operation of the valve 674, operation of the bleed valve 552 by the cam 550 ports one end of the valve 636 to atmosphere. This effects operation of the valve 636 to exhaust the rod end portion of the gripper cylinder assembly 532. A biasing spring 688 in the gripper cylinder assembly actuates the gripper assembly 530 to the disengaged condition so that the cylinder 526 is free to move from the extended position to the retracted position of FIG. 10.

Once the gripper assembly 530 has been released, the compensating cylinder assembly 420 is moved to the retracted position of FIG. 10. In order to conserve air, the compensating piston and cylinder 420 is retracted under the influence of air exhausted from the main cylinder assembly 426 as it is retracted. Thus, the head end of the main piston cylinder assembly 426 is connected with the rod end of the compensating cylinder assembly 420 through a conduit 694. This exhaust air causes the compensating piston cylinder assembly to be retracted. A branch conduit 698 conducts the excess exhaust air to atmosphere through a restriction valve 692. Thus, upon operation of the main piston and cylinder assembly 426 through a predetermined loading stroke, the main piston and cylinder assembly is retracted, the gripper assembly 530 is released, and the compensating cylinder assembly 420 is retracted so that the loader mechanism returns to its initial condition (shown in FIG. 10).

The line 680 is also connected to the main clutch actuator 256 to restart the machine when the line is exhausted through the bleed valve 552 by full extension of the main load cylinder. This causes the cam 176 to continue its rotation from the 180° position (FIG. 8) so that the spindle chuck 24 is closed while the gripper assembly remains open and in the extended position. After the spindle chuck 24 is closed, the valve 232 in the sensor assembly 230 (see FIGS. 1 and 7) is opened by the lug 234.

Since the gripper assembly 36 is already in the open condition, operation of the valve 232 does not affect the gripper assembly 36. Continued rotation of the cam 176 from the 270° to the 360° position (FIG. 8) causes the slide assembly 88 and open gripper 36 to be moved through a return stroke to the 360° position (FIG. 8). The feed mechanism 20 is then ready to initiate a feed stroke as soon as the leading end portion of bar stock 22a has been faced or squared off by operation of the machine tool 28. After this has occurred, normal bar feeding operations are resumed by the feed mechanism 20 in the manner previously explained. The line 680 is further connected to the valve 252 to shift its control spool (not shown) when a bar has been loaded to exhaust the biasing pressure on the spool 667 of the chuck position sensor 669.

In view of the foregoing description, it can be seen that the loader mechanism 31 is utilized in combination with the bar stock feed mechanism 20 during feed and loading operations of the machine tool 10. The bar stock feed mechanism includes a gripper assembly 36 which is operative to open and closed conditions with a spindle chuck 24 which is also capable of being opened and closed. Upon initiation of a bar feed operation, the gripper assembly 36 is closed to securely grip a piece of bar stock 22. The spindle chuck 24 is then opened and a gripper assembly is moved through a feed stroke. Upon completion of this feed stroke, the spindle chuck 24 is closed and the gripper assembly 36 is opened and moved away from the chuck through a return stroke. Whenever a piece of bar stock 22 which is being operated on becomes too short to make the next succeeding workpiece, the detector assembly 240 is activated as the gripper assembly 36 is closed without a piece of bar stock between the gripper fingers 44.

The loader mechanism 31 includes a magazine 412 from which pieces of bar stock are first transferred one at a time to an intermediate station 414 and then to a loading station 416 by a tubular transfer member 434. The compensating cylinder assembly 420 is extended to register the leading end portion of a piece of bar stock at the loading station 416 with the feed mechanism 36 and spindle chuck 24 of the associated machine tool 10 by pressing the leading end of the bar stock against the stop member 422. Once the leading end of the bar stock has been registered, the gripper assembly 530 is actuated to clampingly engage the cylinder member 526 to hold it against axial movement. This enables the loader mechanism 31 to compensate for variations in the length of the piece of bar stock. After the stop member 422 has been moved out of the way of the leading end portion of the piece of bar stock 22 by rotation of the tubular transfer member 434, the main piston and cylinder 426 is extended through a predetermined feed stroke to push the piece of bar stock into the feed mechanism 20.

It should be noted that the bar feed mechanism 20 and loader mechanism 31 are constructed so that they can be advantageously utilized with existing machine tools. Thus, the feed mechanism 20 could be mounted on an existing multi-spindle or single spindle screw machine. Of course, the loader mechanism 31 could then be associated with the bar feed mechanism 20 if desired. However, it should be understood that the loader mechanism 31 could be utilized with bar feed mechanisms other than the specific bar feed mechanism 20 which is described herein.

What is claimed is:

1. An apparatus comprising a chuck operable between an open condition and a closed condition in which said chuck is effective to grip bar stock, chuck actuator means for effecting operation of said chuck between the open and closed conditions, feed means for feeding bar stock to said chuck, said feed means including gripper means operable between a closed condition in which said gripper means securely grips the bar stock and an open condition in which said gripper means is ineffective to grip the bar stock, gripper actuator means for effecting operation of said gripper means between the open and closed conditions, means for moving said gripper means through a feed stroke with said gripper means in its closed condition and said chuck in its open condition and for moving said gripper means through a return stroke with said gripper means in its open condition and said chuck in its closed condition, loader means for moving a piece of bar stock into said feed means, and control means for effecting operation of said loader means to move a piece of bar stock into said feed means when said gripper means is in the open condition and for rendering said loader means ineffective to move a piece of bar stock into said gripper means when said gripper means is in the closed condition.

2. An apparatus as set forth in claim 1 wherein said loader means is effective to move a piece of bar stock into said chuck contemporaneously with movement of the piece of bar stock into said feed means, said control means being operable to effect operation of said loader means to move a piece of bar stock into said feed means and said chuck when both said chuck and said gripper means are in their open conditions.

3. An apparatus as set forth in claim 1, wherein said loader means includes a loading station from which a piece of bar stock is moved to said feed means, magazine means for holding a plurality of pieces of bar stock, an intermediate station for receiving each of the plurality of pieces of bar stock in turn from said magazine means, and transfer means for moving one piece of bar stock from said intermediate station to said loading station and for simultaneously therewith moving another piece of bar stock from said magazine means to said intermediate station.

4. An apparatus comprising a chuck operable between an open condition and a closed condition in which said chuck is effective to grip bar stock, chuck actuator means for effecting operation of said chuck between the open and closed conditions, feed means for feeding bar stock to said chuck, said feed means including gripper means operable between a closed condition in which said gripper means securely grips the bar stock and an open condition in which said gripper means is ineffective to grip the bar stock, gripper actuator means for effecting operation of said gripper means between the open and closed conditions, means for moving said gripper means through a feed stroke with said gripper means in its closed condition and said chuck in its open condition and for moving said gripper means through a return stroke with said gripper means in its open condition and said chuck in its closed condition, loader means for moving a piece of bar stock into said feed means, and control means for effecting operation of said loader means to move a piece of bar stock into said feed means when said gripper means is in the open condition and for rendering said loader means ineffective to move a piece of bar stock into said gripper means when said gripper means is in the closed condition, said loader means including a movable stop member, means for moving said stop member between a nonregistering position and a registering position, first pusher means for pressing a leading end portion of a piece of bar stock against said stop member when said stop member is in said registering position to register the leading end portion of the bar stock relative to said feed means, and second pusher means for moving at least the leading end portion of a registered piece of bar stock from said loader means to said feed means when said stop member is in the nonregistering position.

5. An apparatus comprising a chuck operable between an open condition and a closed condition in which said chuck is effective to grip bar stock, chuck actuator means for effecting operation of said chuck between the open and closed conditions, feed means for feeding bar stock to said chuck, said feed means including gripper means operable between a closed condition in which said gripper means securely grips the bar stock and an open condition in which said gripper means is ineffective to grip the bar stock, gripper actuator means for effecting operation of said gripper means between the open and closed conditions, means for moving said gripper means through a feed stroke with said gripper means in its closed condition and said chuck in its open condition and for moving said gripper means through a return stroke with said gripper means in its open condition and said chuck in its closed condition, loader means for moving a piece of bar stock into said feed means, and control means for effecting operation of said loader means to move a piece of bar stock into said feed means when said gripper means is in the open condition and for rendering said loader means ineffective to move a piece of bar stock into said gripper means when said gripper means is in the closed condition, said loader means including base means for supporting said loader means in a predetermined position relative to said feed means, support means connected with said base means for supporting a piece of bar stock in axial alignment with said feed means, magazine means for holding a plurality of pieces of bar stock, transfer means movable relative to said support means through feed and return strokes to feed each piece of bar stock in turn from said magazine means to said support means, stop means movable between a nonregistering position and a registering position in which said stop means blocks movement of a piece of bar stock from said support means to said feed means, said transfer means being operable to effect movement of said stop means from the nonregistering position to the registering position upon operation of said transfer means through a feed stroke and to effect movement of said stop means from the registering position to the nonregistering position upon operation of said transfer means through a return stroke, and pusher means for pressing a leading end portion of a piece of bar stock against said stop means to register the piece of bar stock when said stop means is in the registering position and for pushing the registered piece of bar stock toward said feed means when said stop means is in the nonregistering position.

6. An apparatus as set forth in claim 5, wherein said support means includes an elongated support member fixedly connected with said base means, and said transfer means includes an elongated tubular member disposed in a coaxial relationship with and partially circumscribing said support member and drive means for rotating said tubular member relative to said support member to move a piece of bar stock to said support means.

7. An apparatus comprising a chuck operable between an open condition and a closed condition in which said chuck is effective to grip bar stock, chuck actuator means for effecting operation of said chuck between the open and closed conditions, feed means for feeding bar stock to said chuck, said feed means including gripper means operable between a closed condition in which said gripper means securely grips the bar stock and an open condition in which said gripper means is ineffective to grip the bar stock, gripper actuator means for effecting operation of said gripper means between the open and closed conditions, means for moving said gripper means through a feed stroke with said gripper means in its closed condition and said chuck in its open condition and for moving said gripper means through a return stroke with said gripper means in its open condition and said chuck in its closed condition, loader means for moving a piece of bar stock into said feed means, and control means for effecting operation of said loader means to move a piece of bar stock into said feed means when said gripper means is in the open condition and for rendering said loader means ineffective to move a piece of bar stock into said gripper means when said gripper means is in the closed condition, said loader means including a base, cylinder means for defining first and second coaxial operating chambers, first piston means disposed in said first operating chamber for moving said cylinder means relative to said base to position a piece of bar stock with its leading end portion at a predetermined location, retainer means for holding said cylinder means against movement relative to said base, said control means including means for effecting operation of said retainer means to hold said cylinder means against movement relative to said base after the piece of bar stock has been positioned with its leading end portion at the predetermined location, and second piston means disposed in said second operating chamber in a coaxial relationship with said first piston means, said control means including means for effecting operation of said second piston means to push the loading end portion of the piece of bar stock from the predetermined location toward said feed means while said retainer means holds said cylinder means against movement relative to said base.

8. An apparatus as set forth in claim 7, wherein said retainer means includes clamp means for gripping said cylinder means to hold said cylinder means against movement relative to said base.

9. An apparatus operable through a plurality of working cycles to perform work operations on one piece of bar stock at a work area and a loading cycle during which another piece of bar stock is moved into said apparatus in place of the one piece of bar stock, said apparatus comprising a chuck operable between an open condition and a closed condition in which said chuck is effective to grip the bar stock, chuck actuator means for effecting operation of said chuck between the open and closed conditions, feed means for feeding bar stock to said chuck during each working cycle of said apparatus, said feed means including gripper means operable between a closed condition in which said gripper means securely grips the bar stock and an open condition in which said gripper means is ineffective to grip the bar stock, gripper actuator means for operating said gripper means between the open and closed conditions, drive means for moving said gripper means through forward strokes toward said chuck and reverse strokes away from said chuck, loader means for moving a piece of bar stock into said feed means during a loading cycle of said apparatus, and control means for effecting operation of said gripper actuator means and said drive means through a first predetermined operating sequence relative to opening and closing of said chuck during a working cycle and for effecting operation of said gripper actuator means and said drive means through a second operating sequence relative to opening and closing of said chuck during a loading cycle.

10. An apparatus as set forth in claim 9, wherein said control means is effective during said first predetermined operating sequence to maintain said gripper means in the closed condition when said chuck is in the open condition and is effective during at least a portion of said second predetermined operating sequence to effect operation of said chuck actuator means and said gripper actuator means to have both said chuck and said gripper means in their open conditions.

11. An apparatus as set forth in claim 9, wherein said control means includes detector means for detecting when said gripper means is ineffective to grip a piece of bar stock upon operation of said gripper means from the open condition to the closed condition and means for changing from said first predetermined operating sequence to said second predetermined sequence in response to detection by said detector means that said gripper means is ineffective to grip a piece of bar stock upon operation of said gripper means to the closed condition.

12. An apparatus operable through a plurality of working cycles to perform work operations on one piece of bar stock at a work area and a loading cycle during which another piece of bar stock is moved into said apparatus in place of the one piece of bar stock, said apparatus comprising a chuck operable between an open condition and a closed condition in which said chuck is effective to grip the bar stock, chuck actuator means for effecting operation of said chuck between the open and closed conditions, feed means for feeding bar stock to said chuck during each working cycle of said apparatus, said feed means including gripper means operable between a closed condition in which said gripper means securely grips the bar stock and an open condition in which said gripper means is ineffective to grip the bar stock, gripper actuator means for operating said gripper means between the open and closed conditions, drive means for moving said gripper means through forward strokes toward said chuck and reverse strokes away from said chuck, loader means for moving a piece of bar stock into said feed means during a loading cycle of said apparatus, and control means for effecting operation of said gripper actuator means and said drive means through a first predetermined operating sequence relative to opening and closing of said chuck during a working cycle and for effecting operation of said gripper actuator means and said drive means through a second operating sequence relative to opening and closing of said chuck during a loading cycle, said loader means including a magazine for holding a plurality of pieces of bar stock, support means for supporting a piece of bar stock at a loading station spaced from said magazine, transfer means for transferring a piece of bar stock from said magazine to said loading station, first piston and cylinder means for moving a piece of bar stock relative to said support means to register a leading end portion of the piece of bar stock relative to the work area, and second piston and cylinder means for pushing the registered piece of bar stock into said feed means.

13. An apparatus as set forth in claim 12, wherein said first piston and cylinder means is operable to move said second piston and cylinder means relative to said support means to register a piece of bar stock at the loading station.

14. An apparatus comprising spindle means for rotating bar stock during a machining operation, said spindle means including a chuck operable between an open condition and a closed condition in which said chuck is effective to grip the bar stock and chuck actuator means for effecting operation of said chuck between the open and closed conditions, feed means for feeding bar stock to said chuck, said feed means including gripper means operable between a closed condition in which said gripper means securely grips the bar stock and an open condition in which said gripper means is ineffective to grip the bar stock, gripper actuator means for effecting operation of said gripper means between the open and closed conditions, means for moving said gripper means through a feed stroke toward said chuck with said gripper means in its closed condition and said chuck in its open condition and for moving said gripper means through a return stroke away from said chuck with said gripper means in its open condition and said chuck in its closed condition, loader means for moving a piece of bar stock into said feed and spindle means when said gripper means and chuck means are in their open conditions, detector means for detecting when a piece of bar stock in said spindle means has a length which is less than a predetermined length, and control means for effecting operation of said loader means to move a piece of bar stock into said feed and spindle means in response to detection by said detector means that the length of the piece of bar stock in said spindle means is less than the predetermined length, said control means including means for effecting operation of said loader means in response to said detector means when said gripper means and chuck are in their open conditions and for rendering said loader means ineffective to move a piece of bar stock into said feed and spindle means when either of said chuck and gripper means is in the closed condition.

15. An apparatus as set forth in claim 14, wherein said gripper means includes surface means defining an opening through which the bar stock passes, said gripper actuator means being operable to vary the size of said opening from a first cross sectional area to a second cross sectional area which is smaller than said first cross sectional area upon operation of said gripper means from the open condition to the closed condition with a piece of bar stock extending through said opening, said gripper actuator means being operable to vary the size of said opening from said first cross sectional area to a third cross sectional area which is smaller than said second cross sectional area upon operation of said gripper means from the open condition to the closed condition without a piece of bar stock extending through said opening, said detector means being operable to detect a reduction in the size of said opening from said first cross sectional area to said third cross sectional area to thereby detect operation of said gripper means from the open condition to the closed condition without a piece of bar stock in said gripper means.

16. An apparatus as set forth in claim 14, wherein said gripper actuator means includes a piston and cylinder means connected with said gripper means for operation of said gripper means between the open and closed conditions.

17. An apparatus as set forth in claim 16, wherein said piston and cylinder means includes means for defining a passage disposed in axial alignment with said gripper means and said chuck, said loader means being operable to move a piece of bar stock through said passage into said gripper means and chuck.

18. An apparatus comprising magazine means for holding a plurality of pieces of bar stock, first support means for supporting a piece of bar stock at an intermediate station spaced from the plurality of pieces of bar stock in said magazine means, second support means for supporting a piece of bar stock at a loading location spaced from said intermediate station, and transfer means for moving one piece of bar stock from said intermediate station to said loading station and for simultaneously therewith moving another piece of bar stock from said magazine means to said intermediate station, a chuck operable between an open condition and a closed condition in which said chuck is effective to grip a piece of bar stock, chuck actuator means for effecting operation of said chuck between the open and closed conditions, feed means for feeding a piece of bar stock to said chuck, said feed means including gripper means operable between a closed condition in which said gripper means securely grips a piece of bar stock and an open condition in which said gripper means is ineffective to grip a piece of bar stock, gripper actuator means for effecting operation of said gripper means between the open and closed conditions when said chuck is in the closed condition, and means for moving said gripper means through a feed stroke toward said chuck with said gripper means in its closed condition and said chuck in its open condition and for moving said gripper means through a return stroke away from said chuck with said gripper means in its open condition and said chuck in its closed condition.

19. An apparatus as set forth in claim 18, wherein said gripper actuator means includes a piston and cylinder assembly connected with said gripper means and control means for activating said piston and cylinder assembly to effect operation of said gripper means between its open and closed conditions.

* * * * *